US00RE47183E

(19) United States
(12) Reissued Patent
Lee et al.

(10) Patent Number: US RE47,183 E
(45) Date of Reissued Patent: Dec. 25, 2018

(54) DIGITAL BROADCASTING SYSTEM AND METHOD OF PROCESSING DATA IN DIGITAL BROADCASTING SYSTEM

(71) Applicant: LG ELECTRONICS INC., Seoul (KR)

(72) Inventors: Chul Soo Lee, Seoul (KR); In Hwan Choi, Gwacheon-si (KR); Kook Yeon Kwak, Anyang-si (KR); Jin Woo Kim, Seoul (KR); Jae Hyung Song, Seoul (KR); Jin Pil Kim, Seoul (KR); Won Gyu Song, Seoul (KR); Hyoung Gon Lee, Seoul (KR); Byoung Gill Kim, Seoul (KR); Jong Yeul Suh, Seoul (KR)

(73) Assignee: LG ELECTRONICS INC., Seoul (KR)

(21) Appl. No.: 14/638,900

(22) Filed: Mar. 4, 2015

Related U.S. Patent Documents

Reissue of:
(64) Patent No.: 8,391,404
Issued: Mar. 5, 2013
Appl. No.: 13/420,471
Filed: Mar. 14, 2012

U.S. Applications:
(63) Continuation of application No. 13/178,453, filed on Jul. 7, 2011, now Pat. No. 8,165,244, which is a
(Continued)

(30) Foreign Application Priority Data

Aug. 25, 2008 (KR) ..... 10-2008-0083068

(51) Int. Cl.
*H04L 27/00* (2006.01)
*H04B 1/00* (2006.01)
(Continued)

(52) U.S. Cl.
CPC ..... *H04H 20/30* (2013.01); *H04H 60/73* (2013.01); *H04H 20/57* (2013.01)

(58) Field of Classification Search
CPC ..... H04H 20/30; H04H 60/73; H04H 20/57
(Continued)

(56) References Cited

U.S. PATENT DOCUMENTS 5,208,816 A 5/1993 Seshardi et al.
5,258,987 A 11/1993 Wei
(Continued)

FOREIGN PATENT DOCUMENTS

CN 1463126 A 12/2003
CN 1496107 A 5/2004
(Continued)

OTHER PUBLICATIONS

Kim, Sung-Hoon, et al.; "Enhanced-x VSB System Development for Improving ATSC Terrestrial DTV Transmission Standard"; IEEE Transactions on Broadcasting, vol. 52, No. 2, Jun. 2006.
(Continued)

*Primary Examiner* — Majid A Banankhah
(74) *Attorney, Agent, or Firm* — Dentons US LLP

(57) ABSTRACT

A method of processing a digital broadcast signal in a transmitter includes encoding signaling information including a transmission parameter channel, including transmission parameters and a fast information channel (FIC) including cross layer information for mobile service acquisition, and transmitting the broadcast signal including ensembles including the encoded signaling information. The FIC is divided into FIC segments, each FIC segment including a FIC segment header and a FIC segment payload. The FIC segment header includes type information indicating a type of the FIC segment, the FIC further including a first ensemble identifier identifying a specific ensemble includ-
(Continued)

ing a service map table (SMT). The SMT includes a header including a second ensemble identifier corresponding to the first ensemble identifier, a payload including service acquisition information of the specific ensemble, and IP access information of a mobile service for acquiring an IP datagram of the mobile service from the specific ensemble.

8 Claims, 28 Drawing Sheets

Related U.S. Application Data continuation of application No. 12/198,089, filed on Aug. 25, 2008, now Pat. No. 8,005,167.

(60) Provisional application No. 61/076,686, filed on Jun. 29, 2008, provisional application No. 61/044,504, filed on Apr. 13, 2008, provisional application No. 60/977,379, filed on Oct. 4, 2007, provisional application No. 60/974,084, filed on Sep. 21, 2007, provisional application No. 60/969,166, filed on Aug. 31, 2007, provisional application No. 60/957,714, filed on Aug. 24, 2007.

(51) Int. Cl.
*H04H 20/30* (2008.01)
*H04H 60/73* (2008.01)
*H04H 20/57* (2008.01)

(58) Field of Classification Search
USPC ..... 375/295, 146, 285, 298, 345; 348/425.3, 348/432.1, 460, 473; 370/441, 335, 342
See application file for complete search history.

(56) References Cited

U.S. PATENT DOCUMENTS 5,301,167 A 4/1994 Proakis et al.
5,502,506 A 3/1996 Choi
5,508,752 A 4/1996 Kim et al.
5,619,269 A 4/1997 Lee et al.
5,619,386 A 4/1997 Voorman et al.
5,634,138 A 5/1997 Ananthan et al.
5,649,284 A 7/1997 Yoshinobu
5,691,993 A 11/1997 Fredrickson
5,740,205 A 4/1998 Baum et al.
5,754,651 A * 5/1998 Blatter et al. ..... 380/241
5,757,416 A 5/1998 Birch et al.
5,797,093 A 8/1998 Houde
5,805,076 A 9/1998 Ito et al.
5,867,503 A 2/1999 Ohsuga et al.
5,903,324 A 5/1999 Lyons et al.
5,936,949 A 8/1999 Pasternak et al.
5,956,373 A 9/1999 Goldston et al.
5,978,424 A 11/1999 Turner
6,021,421 A 2/2000 Retter et al.
6,049,651 A 4/2000 Oshima
6,061,826 A 5/2000 Thirumoorthy et al.
6,067,457 A 5/2000 Erickson et al.
6,091,440 A 7/2000 Kokkinen
6,124,898 A 9/2000 Patel et al.
6,212,659 B1 4/2001 Zehavi
6,219,386 B1 4/2001 Amrany et al.
6,233,295 B1 5/2001 Wang
6,243,469 B1 6/2001 Kataoka et al.
6,263,466 B1 7/2001 Hinedi et al.
6,266,813 B1 7/2001 Ihara
6,285,681 B1 9/2001 Kolze et al.
6,289,485 B1 9/2001 Shiomoto
6,308,066 B1 10/2001 Ranta et al.
6,314,366 B1 11/2001 Farmakis et al.
6,334,187 B1 12/2001 Kadono
6,339,618 B1 1/2002 Puri et al.
6,370,391 B1 4/2002 Lietsalmi et al.
6,373,534 B1 4/2002 Yasuki et al.
6,396,423 B1 5/2002 Laumen
6,411,253 B1 6/2002 Cox et al.
6,459,741 B1 10/2002 Grabb et al.
6,490,007 B1 12/2002 Bouillet et al.
6,498,936 B1 12/2002 Raith
6,512,759 B1 1/2003 Hashimoto et al.
6,515,713 B1 2/2003 Nam
6,553,538 B2 4/2003 Zehavi
6,573,947 B1 6/2003 Oh
6,628,667 B1 9/2003 Murai et al.
6,651,250 B1 11/2003 Takai
6,665,343 B1 12/2003 Jahanghir et al.
6,671,002 B1 12/2003 Konishi et al.
6,680,952 B1 1/2004 Berg et al.
6,686,880 B1 2/2004 Marko et al.
6,731,700 B1 5/2004 Yakhnich et al.
6,734,920 B2 5/2004 Ghosh et al.
6,744,474 B2 6/2004 Markman
6,760,077 B2 7/2004 Choi et al.
6,768,517 B2 7/2004 Limberg et al.
6,775,334 B1 8/2004 Liu et al.
6,775,800 B2 8/2004 Edmonston et al.
6,785,513 B1 8/2004 Sivaprakasam
6,803,970 B1 10/2004 Limberg et al.
6,810,084 B1 10/2004 Jun et al.
6,816,204 B2 11/2004 Limberg
6,917,655 B2 7/2005 Fimoff et al.
6,924,753 B2 8/2005 Bretl et al.
6,927,708 B2 8/2005 Fimoff
6,931,198 B1 8/2005 Hamada et al.
6,944,242 B2 9/2005 Yakhnich et al.
6,947,487 B2 9/2005 Choi et al.
6,952,595 B2 10/2005 Ikedo et al.
6,956,619 B2 10/2005 Choi et al.
6,973,137 B2 12/2005 Birru et al.
6,975,689 B1 12/2005 McDonald et al.
6,977,914 B2 12/2005 Paila et al.
6,980,603 B2 12/2005 Choi et al.
6,985,537 B1 1/2006 Milbar
6,993,021 B1 1/2006 Chuah et al.
6,993,062 B1 1/2006 Kong et al.
6,996,133 B2 2/2006 Bretl et al.
7,010,038 B2 3/2006 Choi et al.
7,016,327 B2 3/2006 Grilli et al.
7,016,446 B1 3/2006 Spalink
7,020,481 B2 3/2006 Kivijarvi
7,027,103 B2 4/2006 Choi et al.
7,030,935 B2 4/2006 Choi et al.
7,038,732 B1 5/2006 Limberg et al.
7,042,949 B1 5/2006 Omura et al.
7,085,324 B2 8/2006 Choi et al.
7,092,447 B2 8/2006 Choi et al.
7,092,455 B2 8/2006 Choi et al.
7,102,692 B1 9/2006 Carlsgaard et al.
7,110,449 B2 9/2006 Heo et al.
7,111,221 B2 9/2006 Birru et al.
7,130,313 B2 10/2006 Pekonen
7,148,932 B2 12/2006 Choi et al.
7,151,575 B1 12/2006 Landry et al.
7,194,047 B2 3/2007 Strolle et al.
7,206,352 B2 4/2007 Birru et al.
7,209,459 B2 4/2007 Kangas
7,221,358 B2 5/2007 Sasaki
7,221,680 B2 * 5/2007 Vijayan et al. ..... 370/441
7,343,487 B2 3/2008 Lindqvist et al.
7,359,357 B2 4/2008 Rhee et al.
7,376,074 B2 5/2008 Jung et al.
7,430,251 B2 9/2008 Choi et al.
7,440,516 B2 10/2008 Kim et al.
7,450,613 B2 11/2008 Choi et al.
7,454,683 B2 11/2008 Vesma et al.
7,460,606 B2 12/2008 Choi et al.
7,486,640 B2 2/2009 Borsos et al.
7,584,495 B2 9/2009 Hannuksela et al.
7,590,187 B2 9/2009 Jeong et al.
7,711,045 B2 * 5/2010 Park et al. ..... 375/240.01

(56) References Cited

U.S. PATENT DOCUMENTS 7,792,103 B2 9/2010 Kim et al.
7,933,232 B2 4/2011 Lee et al.
8,165,244 B2 * 4/2012 Lee et al. ..... 375/295
8,490,147 B2 7/2013 Lee et al.
2001/0011213 A1 8/2001 Hindie et al.
2001/0034867 A1 10/2001 Jaffe et al.
2001/0038744 A1 11/2001 Yamada et al.
2002/0080992 A1 6/2002 Decker et al.
2002/0085632 A1 7/2002 Choi et al.
2002/0089078 A1 7/2002 Suzuki et al.
2002/0126222 A1 9/2002 Choi et al.
2002/0136197 A1 9/2002 Owen et al.
2002/0136276 A1 9/2002 Franceschini et al.
2002/0138806 A1 9/2002 Scalise et al.
2002/0150246 A1 10/2002 Ogino
2002/0154709 A1 10/2002 Choi et al.
2002/0157099 A1 10/2002 Schrader et al.
2002/0159520 A1 10/2002 Choi et al.
2002/0172154 A1 11/2002 Uchida et al.
2002/0186790 A1 12/2002 Choi et al.
2002/0187767 A1 12/2002 Meehan
2002/0191716 A1 12/2002 Xia et al.
2002/0194570 A1 12/2002 Birru et al.
2003/0046431 A1 3/2003 Belleguie
2003/0066082 A1 4/2003 Kliger et al.
2003/0067899 A9 4/2003 Chen et al.
2003/0093798 A1 5/2003 Rogerson
2003/0099303 A1 5/2003 Birru et al.
2003/0103446 A1 6/2003 Negishi et al.
2003/0115540 A1 6/2003 Bae et al.
2003/0121045 A1 6/2003 Cho
2003/0125033 A1 7/2003 Rindsberg et al.
2003/0152107 A1 8/2003 Pekonen
2003/0193618 A1 10/2003 Patel et al.
2003/0206053 A1 11/2003 Xia et al.
2003/0223519 A1 12/2003 Jeong et al.
2003/0234890 A1 12/2003 Bae et al.
2004/0022307 A1 2/2004 Dale et al.
2004/0028076 A1 2/2004 Strolle et al.
2004/0034491 A1 2/2004 Kim
2004/0061645 A1 4/2004 Seo et al.
2004/0081199 A1 4/2004 Lopez et al.
2004/0090997 A1 5/2004 Choi et al.
2004/0101046 A1 5/2004 Yang et al.
2004/0105507 A1 6/2004 Chang et al.
2004/0110522 A1 6/2004 Howard et al.
2004/0123332 A1 6/2004 Hanson
2004/0125235 A1 7/2004 Kim et al.
2004/0148642 A1 7/2004 Park et al.
2004/0156460 A1 8/2004 Kim et al.
2004/0237024 A1 11/2004 Limberg
2004/0260985 A1 12/2004 Krieger
2005/0013380 A1 1/2005 Kim et al.
2005/0024543 A1 2/2005 Ramaswamy et al.
2005/0049923 A1 3/2005 Tanaka et al.
2005/0054345 A1 3/2005 Lee
2005/0060760 A1 3/2005 Jaffe et al.
2005/0090235 A1 4/2005 Vermola et al.
2005/0097428 A1 5/2005 Chang et al.
2005/0111586 A1 5/2005 Kang et al.
2005/0129132 A1 6/2005 Choi et al.
2005/0157758 A1 7/2005 Yoo
2005/0162886 A1 7/2005 Jeong et al.
2005/0166244 A1 7/2005 Moon
2005/0168641 A1 8/2005 Seo
2005/0175080 A1 8/2005 Bouillett
2005/0249300 A1 11/2005 Jeong et al.
2005/0249301 A1 11/2005 Jeong et al.
2005/0259813 A1 11/2005 Wasilewski et al.
2005/0262419 A1 11/2005 Becker et al.
2005/0271158 A1 12/2005 Birru
2005/0289586 A1 12/2005 Park et al.
2005/0289592 A1 12/2005 Vermola
2006/0007953 A1 1/2006 Vesma et al.
2006/0015914 A1 1/2006 Lee
2006/0018269 A1 1/2006 Agrawal et al.
2006/0029159 A1 2/2006 Oh et al.
2006/0031905 A1 2/2006 Kwon
2006/0039460 A1 2/2006 Fimoff et al.
2006/0039503 A1 2/2006 Choi et al.
2006/0052052 A1 3/2006 Jung et al.
2006/0072623 A1 4/2006 Park
2006/0078072 A1 4/2006 Cheon et al.
2006/0104391 A1 5/2006 Choi et al.
2006/0126633 A1 6/2006 Park
2006/0126668 A1 6/2006 Kwon et al.
2006/0126757 A1 6/2006 Choi et al.
2006/0130099 A1 6/2006 Rooyen
2006/0133429 A1 6/2006 Seo et al.
2006/0140301 A1 6/2006 Choi et al.
2006/0146797 A1 7/2006 Lebizay
2006/0146955 A1 7/2006 Choi et al.
2006/0159183 A1 7/2006 Gaddam et al.
2006/0184965 A1 8/2006 Lee et al.
2006/0194536 A1 8/2006 Kim et al.
2006/0223461 A1 10/2006 Laroia et al.
2006/0245488 A1 11/2006 Puputti et al.
2006/0245505 A1 11/2006 Limberg
2006/0245516 A1 11/2006 Simon
2006/0246836 A1 11/2006 Simon
2006/0248563 A1 11/2006 Lee et al.
2006/0253890 A9 11/2006 Park et al.
2006/0262227 A1 11/2006 Jeong
2006/0262744 A1 11/2006 Xu et al.
2006/0262863 A1 11/2006 Park et al.
2006/0263863 A1 11/2006 Park et al.
2006/0268671 A1 11/2006 Coon
2006/0268673 A1 11/2006 Roh et al.
2006/0271991 A1 11/2006 Bae et al.
2006/0285608 A1 12/2006 Kim et al.
2007/0003217 A1 1/2007 Jang
2007/0014379 A1 1/2007 Park et al.
2007/0041399 A1 2/2007 Wendling et al.
2007/0071110 A1 3/2007 Choi et al.
2007/0079223 A1 4/2007 Mondin et al.
2007/0092043 A1 4/2007 Yu et al.
2007/0101352 A1 5/2007 Rabina et al.
2007/0121681 A1 5/2007 Kang et al.
2007/0121748 A1 5/2007 Park et al.
2007/0127598 A1 6/2007 Kang et al.
2007/0130495 A1 6/2007 Yoon et al.
2007/0136643 A1 6/2007 Kang et al.
2007/0140368 A1 6/2007 Kim et al.
2007/0168844 A1 7/2007 Jeong et al.
2007/0172003 A1 7/2007 Kim et al.
2007/0195889 A1 8/2007 Hong et al.
2007/0201544 A1 8/2007 Zhu et al.
2007/0206590 A1 9/2007 Baek et al.
2007/0230460 A1 10/2007 Jeong et al.
2007/0230607 A1 10/2007 Yu et al.
2007/0237184 A1 10/2007 Park et al.
2007/0242701 A1 10/2007 Lee et al.
2007/0253502 A1 11/2007 Park et al.
2007/0258487 A1 11/2007 Puputti
2007/0268979 A1 11/2007 Chang et al.
2007/0281613 A1 12/2007 Lee et al.
2007/0283412 A1 12/2007 Lie et al.
2007/0297544 A1 12/2007 Choi et al.
2008/0002765 A1 1/2008 Song et al.
2008/0005767 A1 1/2008 Seo
2008/0008155 A1 1/2008 Yoon et al.
2008/0083000 A1 4/2008 Orrell et al.
2008/0095096 A1 4/2008 Cho et al.
2008/0170162 A1 7/2008 Kim et al.
2008/0225799 A1 9/2008 Lee et al.
2008/0239161 A1 10/2008 Kim et al.
2008/0240065 A1 10/2008 Choi et al.
2008/0240293 A1 10/2008 Kim et al.
2008/0240297 A1 10/2008 Kim et al.
2008/0246881 A1 10/2008 Kim et al.
2008/0267307 A1 10/2008 Chang et al.
2008/0273589 A1 11/2008 Kim et al.
2009/0013356 A1 1/2009 Doerr et al.
2009/0028079 A1 1/2009 Song et al.

(56) References Cited

U.S. PATENT DOCUMENTS

| | | | |
|---|---|---|---|
| 2009/0028081 | A1 | 1/2009 | Song et al. |
| 2009/0028230 | A1 | 1/2009 | Leitner |
| 2009/0028272 | A1 | 1/2009 | Song et al. |
| 2009/0052587 | A1 | 2/2009 | Song et al. |
| 2009/0055864 | A1 | 2/2009 | Yoo et al. |
| 2009/0059086 | A1 | 3/2009 | Lee et al. |
| 2009/0067336 | A1 | 3/2009 | Cho et al. |
| 2009/0077588 | A1 | 3/2009 | Sugai |
| 2009/0080405 | A1 | 3/2009 | Lee et al. |
| 2009/0080574 | A1 | 3/2009 | Choi et al. |
| 2009/0129504 | A1 | 5/2009 | Lee et al. |
| 2009/0175218 | A1 | 7/2009 | Song et al. |
| 2009/0235141 | A1 | 9/2009 | Shelby et al. |
| 2009/0252253 | A1 | 10/2009 | Choi et al. |
| 2009/0260041 | A1 | 10/2009 | McGinn et al. |
| 2009/0265751 | A1 | 10/2009 | Limberg |
| 2010/0100793 | A1 | 4/2010 | Limberg |
| 2010/0254494 | A1 | 10/2010 | Song et al. |
| 2011/0261902 | A1 | 10/2011 | Lee et al. |
| 2012/0177149 | A1 | 7/2012 | Lee et al. |

FOREIGN PATENT DOCUMENTS

| | | | |
|---|---|---|---|
| CN | 1678068 | | 10/2005 |
| CN | 1736119 | | 2/2006 |
| CN | 1738436 | | 2/2006 |
| CN | 1829270 | | 9/2006 |
| CN | 1946190 | | 4/2007 |
| CN | 101018105 | A | 8/2007 |
| CN | 101018223 | A | 8/2007 |
| CN | 101022435 | | 8/2007 |
| EP | 0996291 | | 4/2000 |
| EP | 1014711 | | 6/2000 |
| EP | 1085750 | | 3/2001 |
| EP | 1566905 | | 8/2005 |
| EP | 1628420 | | 2/2006 |
| EP | 1768396 | | 3/2007 |
| JP | 9-284664 | A | 10/1997 |
| JP | 11069253 | | 3/1999 |
| JP | 2000224136 | | 8/2000 |
| JP | 2001054031 | | 2/2001 |
| JP | 2001274769 | | 10/2001 |
| JP | 2002218339 | | 8/2002 |
| JP | 2003032640 | | 1/2003 |
| JP | 2003134117 | | 5/2003 |
| JP | 2003209525 | | 7/2003 |
| JP | 2003284037 | | 10/2003 |
| JP | 2004129126 | | 4/2004 |
| JP | 2006148543 | | 6/2006 |
| JP | 2007096403 | | 4/2007 |
| KR | 10-1998-0023115 | | 7/1998 |
| KR | 1020000040481 | | 7/2000 |
| KR | 20030026236 | | 3/2003 |
| KR | 1020030030175 | | 4/2003 |
| KR | 1020030037138 | | 5/2003 |
| KR | 1020030062138 | | 7/2003 |
| KR | 10-2004-0013153 | | 2/2004 |
| KR | 1020040032282 | | 4/2004 |
| KR | 1020040032283 | | 4/2004 |
| KR | 1020050036552 | | 4/2005 |
| KR | 1020050041489 | | 5/2005 |
| KR | 10-2005-0062867 | | 6/2005 |
| KR | 10-2005-0062867 | A | 6/2005 |
| KR | 1020050065898 | | 6/2005 |
| KR | 1020050072988 | | 7/2005 |
| KR | 10-2005-0093921 | | 9/2005 |
| KR | 1020050112879 | | 12/2005 |
| KR | 1020050117314 | | 12/2005 |
| KR | 10-2006-0016582 | A | 2/2006 |
| KR | 10-2006-0017695 | | 2/2006 |
| KR | 1020060009737 | | 2/2006 |
| KR | 1020060012510 | | 2/2006 |
| KR | 1020060039728 | | 5/2006 |
| KR | 1020060053061 | | 5/2006 |
| KR | 1020060055959 | | 5/2006 |
| KR | 10-2006-0065435 | A | 6/2006 |
| KR | 1020060063867 | | 6/2006 |
| KR | 1020060065435 | | 6/2006 |
| KR | 1020060068449 | | 6/2006 |
| KR | 1020060068989 | | 6/2006 |
| KR | 1020060070665 | | 6/2006 |
| KR | 1020060072573 | | 6/2006 |
| KR | 10-2006-0095235 | | 8/2006 |
| KR | 1020060095126 | | 8/2006 |
| KR | 1020060102160 | | 9/2006 |
| KR | 1020060117484 | | 11/2006 |
| KR | 1020060133011 | | 12/2006 |
| KR | 1020070007995 | | 1/2007 |
| KR | 1020070013168 | | 1/2007 |
| KR | 1020070015810 | | 2/2007 |
| KR | 10-2007-0034215 | | 3/2007 |
| KR | 100710248 | | 4/2007 |
| KR | 1020070068015 | | 6/2007 |
| KR | 1020070068960 | | 7/2007 |
| KR | 1020070075549 | | 7/2007 |
| KR | 10-2007-0079328 | | 8/2007 |
| WO | 0044145 | | 7/2000 |
| WO | 0045552 | | 8/2000 |
| WO | 0105157 | | 1/2001 |
| WO | 01005157 | | 1/2001 |
| WO | 03017254 | | 2/2003 |
| WO | 03049449 | | 6/2003 |
| WO | 2004057873 | | 7/2004 |
| WO | 2004066652 | | 8/2004 |
| WO | 2005/032034 | | 4/2005 |
| WO | 2005/043403 | A1 | 5/2005 |
| WO | 2005069624 | | 7/2005 |
| WO | 2005/101655 | A1 | 10/2005 |
| WO | 2005/109878 | A1 | 11/2005 |
| WO | 2006/003531 | | 1/2006 |
| WO | 2006003531 | | 1/2006 |
| WO | 2007/030590 | A1 | 3/2007 |
| WO | 2007/046676 | A1 | 4/2007 |
| WO | 2007/089108 | | 8/2007 |
| WO | 2008105587 | | 9/2008 |
| WO | 2009/038402 | | 3/2009 |
| WO | 2009/038405 | | 3/2009 |

OTHER PUBLICATIONS

ATSC Standards: "A/53: ATSC Digital Television Standard, Parts 1-6", Advanced Television Systems Committee, Inc, Washington, D.C., USA. vol. A/53, Jan. 3, 2007, pp. 1-136, XP008115585, Retrieved from the Internet: URL:http"//www.atsc.org/standards/a53/a_53-Part-1-62007.pdf *the whole document*.

ESTI EN 300 744: "Digital Video Broadcasting( DVB); Framing structure, channel coding and modulation for digital terrestrial television (DVB-T)", V1.2.1 (Jul. 1999), XP-002231749.

ESTI EN 300 468: "Digital Video Broadcasting(DVB); Specification for Service Information (SI) in DVB systems", V1.3.1 (Feb. 1998).

Search Report of European Patent Office in Appl'n. No. 08778394.0, dated Oct. 18, 2013.

Notice of Allowance of Korean Patent Office in Appl'n. No. 10-2008-0060491, dated Mar. 20, 2014.

Notice of Allowance of Korean Patent Office in Appl'n. No. 10-2008-0083068, dated Jun. 24, 2014.

Notice of Allowance of Korean Patent Office in Appl'n. No. 10-2014-0107109, dated Sep. 23, 2014.

Office Action of India Patent Office in Appl'n. No. 149/KOLNP/2010, dated Nov. 19, 2014.

Notice of Allowance of the U.S. Patent Office in U.S. Appl. No. 12/962,500, dated May 19, 2014.

Office Action of the U.S. Patent Office in U.S. Appl. No. 14/463,371, dated Nov. 14, 2014.

Office Action of the U.S. Patent Office in U.S. Appl. No. 14/152,742, dated Feb. 10, 2016.

U.S. Appl. No. 13/420,471, filed Mar. 14, 2012 (U.S. Pat. No. 8,391,404).

(56) References Cited

OTHER PUBLICATIONS

U.S. Appl. No. 13/178,453, filed Jul. 7, 2011 (U.S. Pat. No. 8,165,244).
U.S. Appl. No. 12/198,089, filed Aug. 25, 2008 (U.S. Pat. No. 8,005,167).
Chernock, Rich; "PSIP Generation and ATSC Stream Monitoring"; Triveni Digital, Oct. 8, 2004.
Advanced Television Systems Commitee; "Recommended practice: Guide to the Use of the ATSC Digital Television Standard, Including Corrigendum No. 1"; Doc A/54A; Dec. 4, 2003.
ISO/IEC: "Information Technology—Generic Coding of Moving Pictures and Associated Audio Information Systems"; ISO/IEC 13818-1: International Standard; Second Edition; Dec. 1, 2000.
Federal Information Processing Standards Publication 197; Announcing the Advanced Encryption Standard (AES); Nov. 26, 2001.
Graell, A. et al., "Analysis and Design of Rate Compatible Serial Concatenated Convolutional Codes"; Proceedings of the 2005 International Symposium on Information Theory; pp. 607-611; Sep. 4, 2005.
Advanced Television Systems Committee; "ATSC Recommended Practice: E-VSB Implementation Guidelines" ; Doc A/112, Apr. 18, 2006.
Yao, J., "IP Datacasting and Channel Error Handling With DVB-H";Proceedings of the 2005 Emerging Information Technology Conference; XP-010856441; Aug. 15, 2005.
Touzni, A, et al. "Enhanced 8-VSB Transmission for North-American HDTV Terrestrial Broadcast"; Proceedings of the 2003 IEEE International Conference on Acoustics, Speech and Signal Processing; vol. 2; pp. 437-440. XP010640975; Apr. 6, 2003.
Gaddam, V. R., et al., "A Newly Proposed ATSC DTV System for Transmitting a Robust Bit-Stream Along With the Standard Bit-Stream", IEEE Transactions on Consumer Electronics, XP001201224; vol. 49; Issue 4; Nov. 2003.
Gupta, N., "The Eureka 147 Digital Audio Broadcasting System Adapted to the U.S.," Massachusetts Institute of Technology (MIT), May 1996, Retrieved online on Jan. 13, 2010 at http://dspace.mit.edu/bitstream/handle/1721.1/38795/35332950.pdf?sequence=1.
Fairhurst, G. et al.; "Extensions Formats for Unidirectional Lightweight Encapsulation (ULE) and the Generic Stream Encapsulation (GSE)"; Internet Engineering Task Force; Aug. 2007.
European Telecommunications Standards Institute (ETSI); "Digital Video Broadcasting (DVB); Support for Use of Scrambling and Conditional Access (CA) Within Digital Broadcasting Systems"; ETR 289; Oct. 1996.
European Telecommunications Standards Institute (ETSI); "Digital Audio Broadcasting (DAB); Internet Protocol (IP) Datagram Tunnelling"; ETSI ES 201 735; v1.1.1; (Sep. 2000).
European Telecommunications Standards Institute (ETSI); "Digital Audio Broadcasting (DAB); Conditional Access"; ETSI TS 102 367; v1.1.1 (Jan. 2005).
Chari, M et al.; "FLO Physical Layer: An Overview"; IEEE transactions on Broadcasting; vol. 53, Issue 1, part 2; pp. 145-160; Feb. 26, 2007.
European Telecommunications Standards Institute (ETSI); "Digital Video Broadcasting (DVB); IP Datacast Over DVB-H; Program Specific Information (PSI)/Service Information (SI)"; ETSI TS 102 470 v1.1.1; (Apr. 2006).
European Telecommuniaction Standards Institute (ETSI); Digital Audio Broadcasting (DAB); Distribution Interfaces; Ensemble Transport Interface (ETI); ETSI ETS 300 799; Sep. 1997.
Fimoff, M., et al.; "E-VSB Map Signaling", IEEE Transactions on Consumer Electronics; vol. 49; Issue 3; pp. 515-518; Aug. 2003.
Advanced Television Systems Committee; "ATSC Standard: Digital Television Standard (A/53), Revision D, Including Amendment No. 1", DocA/53D; Jul. 19, 2005.
Uehara, M., et al.; "Transmission Scheme for the Terrestrial ISDB System"; IEEE Transactions on Consumer Electronics; vol. 45; Issue 1; Feb. 1999.
ETSI "Digital Video Broadcasting (DVB); DVB-H Implementation Guidelines" ETSI TR 102 377 v1.2.1, Nov. 2005.
ATSC Standard "Program and System Information Protocol for Terrestrial Broadcast and Cable (Revision B)" A/65B, Mar. 18, 2003.
Advanced Television Systems Committee (ATSC); "Candidate Standard: ATSC-M/H Standard, Part 1—Mobile/Handheld Digital Television System (A/153, Part 1:2009)"; Doc. No. S4-130r12; Dec. 31, 2008.
Advanced Television Systems Committee (ATSC); "Candidate Standard: ATSC-M/H Standard, Part 2—Mobile/Handheld Digital Television System (A/153, Part 1:2009)"; Doc. No. S4-131r11; Dec. 31, 2008.
Advanced Television Systems Committee (ATSC); "Candidate Standard: ATSC-M/H Standard, Part 3—Mobile/Handheld Digital Television System (A/153, Part 1:2009)"; Doc. No. S4-132r11; Dec. 31, 2008.
Korean Broadcasting System (KBS); "Technology Trend in DTV RF Transmission"; KBS Broadcast Technical Research; 2007; pp. 73-92.
DVB Document A092 Rev. 2 (Draft v. 1.3.1), DVB-H Implementation Guidelines, May 2007, all pages, (www.dvb-h.org).
ETSI TS 102 470 V1.1.1, Digital Video Broadcasting (DVB); IP Datacast over DVB-H: Program Specific Information (PSI)/Service Information (SI), Apr. 2006, all pages.
OMA-TS-BCAST_SERVICES-V1_0-20070529-C, Mobile Broadcast Services Candidate Version 1.0, May 29, 2007, all pages.
ETSI EN 300 401 V1.4.1, Radio Broadcasting Systems; Digital Audio Broadcasting (DAB) to Mobile, Portable and Fixed Receivers; Jun. 2006.

* cited by examiner

FIG. 15

| Syntax | # of bits |
|---|---|
| FIC_Segment () { | |
| FIC_type | 2 |
| Reserved | 5 |
| error_indicator | 1 |
| FIC_seg_number | 4 |
| FIC_last_seg_number | 4 |
| for (i=0;i<N;i++) { | |
| data_byte | 8 |
| } | |
| } | |

FIC. 16

| | Syntax | # of bits |
|---|---|---|
| A first region | if (FIC_seg_number == 0) { | |
| | current_next_indicator | 1 |
| | Reserved | 2 |
| | ESG_version | 5 |
| | transport_stream_id | 16 |
| | } | |
| A second region | while ( ensemble_id ! = 0xFF ) | |
| | ensemble id | 8 |
| | reserved | 3 |
| | SI_version | 5 |
| | num_channel | 3 |
| A third region | for (i=0;i< num_channel;i++) { | |
| | channel_type | 5 |
| | channel_activity | 2 |
| | CA_indicator | 1 |
| | Stand_alone_Semce_indtcator | |
| | major_channel_num | 8 |
| | minor_channel_num | 8 |
| | } | |
| | } // end of while | |
| | } | |

FIG. 17

| Syntax | No. of Bits | Format |
|---|---|---|
| service_map_table_section() { | | |
| table_id | 8 | TBD |
| section_syntax_indicator | 1 | '0' |
| private_indicator | 1 | '1' |
| reserved | 2 | '11' |
| section_length | 12 | uimsbf |
| reserved | 3 | '111' |
| version_number | 5 | uimsbf |
| section_number | 8 | uimsbf |
| last_section_number | 8 | uimsbf |
| SMT_protocol_version | 8 | uimsbf |
| ensemble_id | 8 | uimsbf |
| num_channels | 8 | uimsbf |
| for (i=0; i<num_channels; i++) | | |
| { | | |
| major_channel_number | 8 | uimsbf |
| minor_channel_number | 8 | uimsbf |
| short_channel_name | 8*8 | |
| service_id | 16 | uimsbf |
| service_type | 6 | uimsbf |
| virtual_channel_activity | 2 | uimsbf |
| num_components | 5 | uimsbf |
| IP_version_flag | 1 | bslbf |
| source_IP_address_flag | 1 | bslbf |
| virtual_channel_target_IP_address_flag | 1 | bslbf |
| if (source_IP_address_flag) | | |
| source_IP_address | 32 or 128 | uimsbf |
| if (virtual_channel_target_IP_address_flag) | | |
| virtual_channel_target_IP_address | 32 or 128 | uimsbf |
| for (j=0; j<num_components; j++) | | |
| { | | |
| RTP_payload_type | 7 | uimsbf |
| component_target_IP_address_flag | 1 | bslbf |
| if (component_target_IP_address_flag) | | |
| component_target_IP_address | 32 or 128 | uimsbf |
| reserved | 2 | '11' |
| port_num_count | 6 | uimsbf |
| target_UDP_port_num | 16 | uimsbf |
| descriptors_length | 8 | uimsbf |
| for (k=0; k<descriptors_length; k++) | | |
| { | | |
| component_level_descriptor() | | |
| } | | |
| } | | |
| descriptors_length | 8 | uimsbf |
| for (m=0; m<descriptors_length; m++) | | |
| { | | |
| virtual_channel_level_descriptor() | | |
| } | | |
| } | | |
| descriptors_length | 8 | uimsbf |
| for (n=0; n<descriptors_length; n++) { | | |
| { | | |
| ensemble_level_descriptor() | | |
| } ensemble_level_descriptor() | | |
| } | | |

FIG. 18

| Syntax | No. of Bits | Format |
|---|---|---|
| MH_audio_descriptor() { | | |
| descriptor_tag | 8 | TBD |
| descriptor_length | 8 | uimsbf |
| channel_configuration | 8 | uimsbf |
| reserved | 5 | '11111' |
| sample_rate_code | 3 | uimsbf |
| reserved | 2 | '11' |
| bit_rate_code | 6 | uimsbf |
| ISO_639_language_code | 3*8 | uimsbf |
| } | | |

FIG. 19

| Syntax | No. of Bits | Format |
|---|---|---|
| MH_RTP_payload_type_descriptor() { | | |
| descriptor_tag | 8 | TBD |
| descriptor_length | 8 | uimsbf |
| reserved | 1 | '1' |
| RTP_payload_type | 7 | uimsbf |
| MIME_type_length | 8 | uimsbf |
| MIME_type() | var | |
| } | | |

FIG. 20

| Syntax | No. of Bits | Format |
|---|---|---|
| MH_current_event_descriptor() { | | |
| descriptor_tag | 8 | TBD |
| descriptor_length | 8 | uimsbf |
| current_event_start_time | 4*8 | uimsbf |
| current_event_duration | 3*8 | uimsbf |
| Title_length | 8 | uimsbf |
| Title_text() | var | |
| } | | |

FIG. 21

| Syntax | No. of Bits | Format |
|---|---|---|
| MH_next_event_descriptor() { | | |
| descriptor_tag | 8 | TBD |
| descriptor_length | 8 | uimsbf |
| next_event_start_time | 4*8 | uimsbf |
| next_event_duration | 3*8 | uimsbf |
| title_length | 8 | uimsbf |
| title_text() | var | |
| } | | |

FIG. 22

| Syntax | No. of Bits | Format |
|---|---|---|
| MH_system_time_descriptor() { | | |
| descriptor_tag | 8 | TBD |
| descriptor_length | 8 | uimsbf |
| system_time | 32 | uimsbf |
| GPS_UTC_offset | 8 | uimsbf |
| time_zone_offset_polarity_rate_code | 1 | bslbf |
| time_zone_offset | 31 | uimsbf |
| daylight_savings() | 16 | uimsbf |
| time_zone() | 5*8 | |
| } | | |

FIG. 26

| Syntax | No. of Bits | Format |
|---|---|---|
| FIC segment Header() { | | |
| FIC_type | 2 | |
| FIC_segment_number | 3 | uimsbf |
| FIC_last_segment_number | 3 | uimsbf |
| FIC_Update_Notifier | 4 | uimsbf |
| ESG_version | 4 | uimsbf |
| } | | |
| FIC segment Payload() { | | |
| FIC_ensemble_header() { | | uimsbf |
| ensemble_id | 8 | uimsbf |
| RS_frame_continuity_counter | 4 | uimsbf |
| signalling_version | 4 | uimsbf |
| num_channels | 8 | uimsbf |
| } | | |
| FIC_ensemble_payload() { | | |
| for (j=0; j< num_channels; j++) | | |
| Channel_type | 6 | uimsbf |
| CA_indicator | 1 | uimsbf |
| Primary_Service_indicator | 1 | uimsbf |
| major_channel_num | 8 | uimsbf |
| minor_channel_num | 8 | uimsbf |
| } | | |
| } | | |

FIG. 28

| Syntax | No. of Bits | Format |
|---|---|---|
| FIC segmen Header() { | | |
| FIC_type | 2 | |
| num_channels | 6 | uimsbf |
| ensemble_id | 8 | uimsbf |
| FIC_segment_number | 8 | uimsbf |
| FIC_last_segment_number | 8 | uimsbf |
| } | | |
| FIC segment Payload() { | | |
| FIC_channel_header() { | | |
| ESG_requirement_flag | 1 | bslbf |
| num_streams | 6 | uimsbf |
| IP_address_flag | 1 | uimsbf |
| Targer_IP_address | 32 or 48 | uimsbf |
| } | | |
| FIC_channe_payload() { | | |
| for (j=0; j< num_streams; j++) | | |
| stream_type | 8 | uimsbf |
| target_port_number | 8 | uimsbf |
| ISO_639_language_code | 8*3 | uimsbf |
| } | | |
| } | | |

FIG. 29

| Value | Meaning |
|---|---|
| 0x00 | [ Reserved ] |
| 0x01 | Real-time A/V Broadcasting |
| 0x02 | Real-time Audio only Broadcasting |
| 0x03 | Real-time A/V Broadcasting associated with Data Broadcasting |
| 0x04 | Real-time Audio only Broadcasting associated with Data Broadcasting |
| 0x05 | Non-Real-Time A/V Broadcasting |
| 0x06 | Non-Real-Time Audio only Broadcasting |
| 0x07 | Non-Real-Time Data Broadcasting / File Transfer |
| 0x07-0xFF | Reserved for future |

FIG. 31

| Syntax | Num. of Bits |
|---|---|
| table_id | 8 bit |
| Section_Number | 8 bit |
| Last_Section_Number | 8 bit |
| for (i=0; i<num_channels_in_ensemble; i++) | |
| { | |
| ESG_requirement_flag | 1 bit |
| num_Streams | 6 bit |
| IP_version_flag | 1 bit |
| if (IP_version_flag == 1) | |
| target_IP_address | 48 bit |
| else | |
| target_IP_address | 32 bit |
| for (j=0; i<num_Streams; j++) | |
| { | |
| stream_type | 8 bit |
| target_Port_number | 8 bit |
| if (stream_type == 0x02) | |
| ISO_639_language_code | 8*3 bit |
| } | |
| } | |

FIG. 32

| Value | Meaning |
|---|---|
| 0x00 | [ Reserved ] |
| 0x01 | MPH Video Stream |
| 0x02 | MPH Audio Stream |
| 0x03 | MPH Data Broadcasting Stream |
| 0x04 | MPH File Transfer Stream |
| 0x05-0xFF | [ Reserved ] |

DIGITAL BROADCASTING SYSTEM AND METHOD OF PROCESSING DATA IN DIGITAL BROADCASTING SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application *is a reissue application of U.S. Pat. No. 8,391,404, issued on Mar. 5, 2013 from U.S. patent application Ser. No. 13/420,471, filed on Mar. 14, 2012, which* is a continuation of U.S. patent application Ser. No. 13/178,453, filed on Jul. 7, 2011, now U.S. Pat. No. 8,165,244, which is a continuation of U.S. patent application Ser. No. 12/198,089, filed on Aug. 25, 2008, now U.S. Pat. No. 8,005,167, which claims the benefit of earlier filing date and right of priority to Korean Patent Application No. 10-2008-0083068, filed on Aug. 25, 2008, and also claims the benefit of U.S. Provisional Application Ser. Nos. 61/076,686, filed on Jun. 29, 2008, 61/044,504, filed on Apr. 13, 2008, 60/977,379, filed on Oct. 4, 2007, 60/974,084, filed on Sep. 21, 2007, 60/969,166, filed on Aug. 31, 2007, and 60/957,714, filed on Aug. 24, 2007, the contents of which are all incorporated by reference herein in their entirety.

BACKGROUND OF THE INVENTION

1. Field of the Invention

The present invention relates to a digital broadcasting system, and more particularly, to a digital broadcasting system and a data processing method.

2. Discussion of the Related Art

The Vestigial Sideband (VSB) transmission mode, which is adopted as the standard for digital broadcasting in North America and the Republic of Korea, is a system using a single carrier method. Therefore, the receiving performance of the digital broadcast receiving system may be deteriorated in a poor channel environment. Particularly, since resistance to changes in channels and noise is more highly required when using portable and/or mobile broadcast receivers, the receiving performance may be even more deteriorated when transmitting mobile service data by the VSB transmission mode.

SUMMARY OF THE INVENTION

An object of the present invention is to provide a digital broadcasting system and a data processing method that are highly resistant to channel changes and noise. An object of the present invention is to provide a digital broadcasting system and a method of processing data in a digital broadcasting system that can enhance the receiving performance of a receiving system (or receiver) by having a transmitting system (or transmitter) perform additional encoding on mobile service data. Another object of the present invention is to provide a digital broadcasting system and a method of processing data in the digital broadcasting system that can also enhance the receiving performance of a digital broadcast receiving system by inserting known data already known in accordance with a pre-agreement between the receiving system and the transmitting system in a predetermined region within a data region.

Another object of the present invention is to provide a digital broadcasting system and a data processing method which can quickly access services of mobile service data when the mobile service data is multiplexed with main service data and the multiplexed resultant data is transmitted.

The present invention provides a data processing method. The data processing method includes receiving a broadcast signal in which main service data and mobile service data are multiplexed, acquiring transmission-parameter-channel signaling information including transmission parameter information of the mobile service data, and fast-information-channel signaling information, acquiring binding information describing a relationship between at least one ensemble transferring the mobile service data and a first virtual channel contained in any of the at least one ensemble by decoding fast-information-channel signaling information, acquiring ensemble identification information transferring the first virtual channel using the binding information, and receiving at least one mobile service data group transferring an ensemble according to the ensemble identification information, parsing service table information contained in the ensemble and decoding content data contained in the first virtual channel using the parsed service table information, and displaying the decoded content data.

Also, the present invention provides the processing method performing a first error correction encoding process on fast-information-channel signaling information including binding information, in which the binding information describes a relationship between a first virtual channel in any of at least one ensemble transferring mobile service data and the ensemble transferring the first virtual channel, performing a second error correction encoding process on mobile service data to be transferred to the ensemble and service table information describing channel information of the ensemble and multiplexing the encoded fast-information-channel signaling information and the mobile service data, multiplexing the multiplexed mobile service data and main service data, and modulating the resultant multiplexed data.

The present invention provides a digital broadcasting system. The digital broadcasting system includes a baseband processor configured to acquire transmission-parameter-channel signaling information including transmission parameter information of mobile service data and fast-information-channel signaling information from a broadcast signal, and receive a mobile service data group which transmits an ensemble according to fast-information-channel signaling information including binding information describing a relationship between a first virtual channel of the mobile service data and the ensemble transferring the first virtual channel, a management processor configured to acquire the binding information by decoding the fast-information-channel signaling information, and parsing service table information of the ensemble received according to the binding information and a presentation processor configured to decode mobile service data of the first virtual channel according to the service table information, and displaying content data contained in the decoded mobile service data.

The fast-information-channel signaling information may be divided into a plurality of segments according to the mobile service data group. The fast-information-channel signaling information may include channel type information indicating a type of a service transferred to the virtual channel. The fast-information-channel signaling information may include a major-channel number and a minor-channel number of the virtual channel, which is contained in each ensemble according to the ensemble identification information. The fast-information-channel signaling information includes transport stream identification information of a broadcast signal.

The transmission-parameter-channel signaling information may include version information of the fast-information-channel signaling information.

The baseband processor may receive a time-discontinuous mobile service data group, and receive the ensemble including the first virtual channel by using the fast-information-channel signaling information.

The presentation processor may include an application manager providing data broadcasting using the data broadcasting content, and a display module outputting the data broadcasting provided by the application manager.

The data group is contained in data groups in the broadcast signal, where the data groups are time-discontinuously received.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings;

FIG. 15 illustrates an exemplary bit stream syntax structure with respect to an FIC segment according to an embodiment of the present invention;

FIG. 16 illustrates an exemplary bit stream syntax structure with respect to a payload of an FIC segment according to the present invention, when an FIC type field value is equal to '0';

FIG. 17 illustrates an exemplary bit stream syntax structure of a service map table according to the present invention;

FIG. 18 illustrates an exemplary bit stream syntax structure of an MH audio descriptor according to the present invention;

FIG. 19 illustrates an exemplary bit stream syntax structure of an MH RTP payload type descriptor according to the present invention;

FIG. 20 illustrates an exemplary bit stream syntax structure of an MH current event descriptor according to the present invention;

FIG. 21 illustrates an exemplary bit stream syntax structure of an MH next event descriptor according to the present invention;

FIG. 22 illustrates an exemplary bit stream syntax structure of an MH system time descriptor according to the present invention;

FIG. 26 is a table illustrating syntax of the second-type FIC segment shown in FIG. 25 according to the present invention;

FIG. 28 is a table illustrating a structure of the third-type FIC segment shown in FIG. 28 according to the present invention;

FIG. 29 is a channel type contained in FIC data according to the present invention;

FIG. 31 shows another example of an SMT according to the present invention;

FIG. 32 is a stream type of a virtual channel according to the present invention.

DETAILED DESCRIPTION OF THE INVENTION

Figure 1:
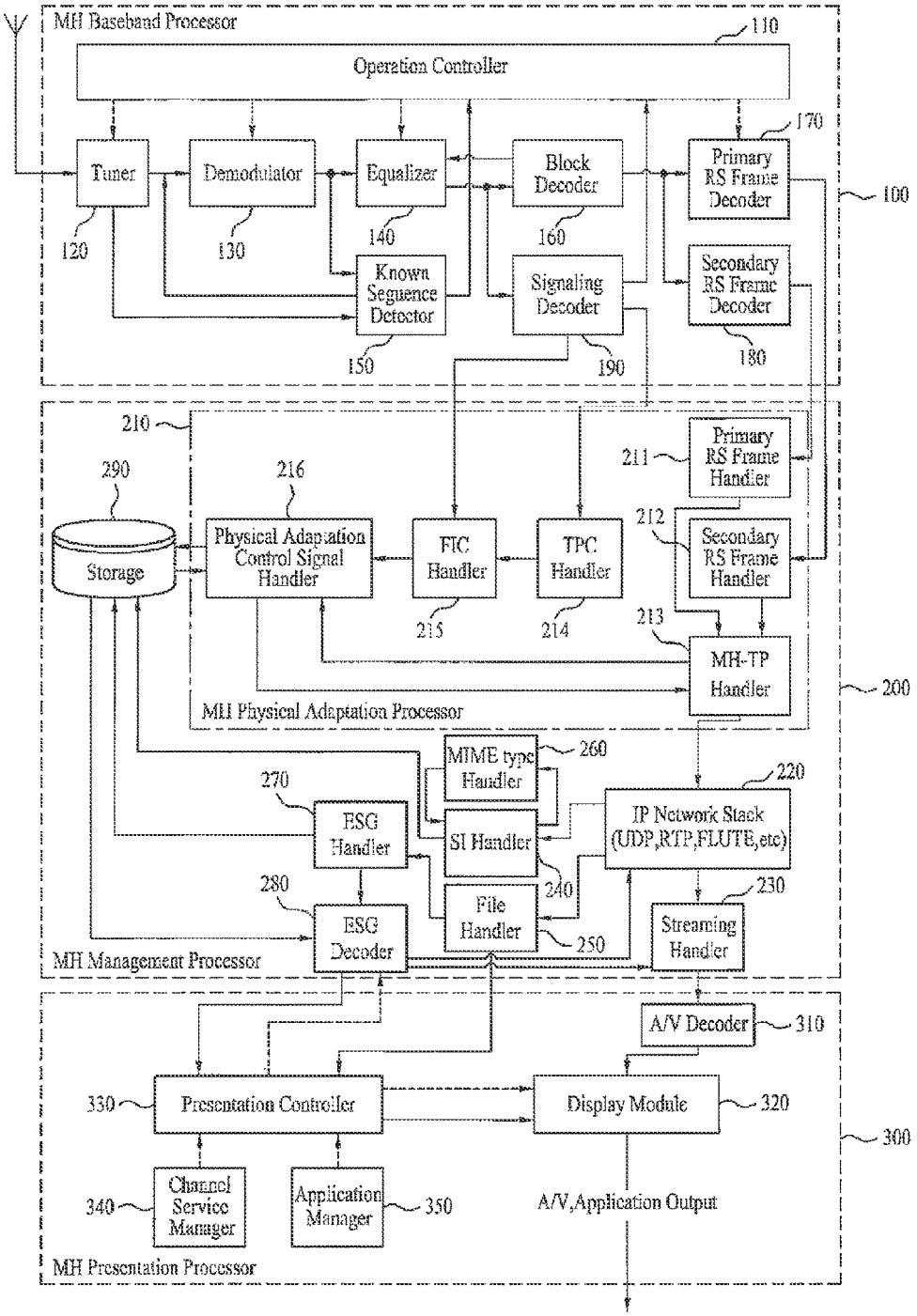
FIG. 1 illustrates a block diagram showing a general structure of a digital broadcasting receiving system according to an embodiment of the present invention.

Reference will now be made in detail to the preferred embodiments of the present invention, examples of which are illustrated in the accompanying drawings. At this time, it is to be understood that the following detailed description of the present invention illustrated in the drawings and described with reference to the drawings are exemplary and explanatory and technical spirits of the present invention and main features and operation of the present invention will not be limited by the following detailed description.

Definition of Terms Used in the Present Invention

Although general terms, which are widely used considering functions in the present invention, have been selected in the present invention, they may be changed depending on intention of those skilled in the art, practices, or new technology. Also, in specific case, the applicant may optionally select the terms. In this case, the meaning of the terms will be described in detail in the description part of the invention. Therefore, it is to be understood that the terms should be defined based upon their meaning not their simple title and the whole description of the present invention.

Among the terms used in the description of the present invention, main service data correspond to data that can be received by a fixed receiving system and may include audio/video (A/V) data. More specifically, the main service data may include A/V data of high definition (HD) or standard definition (SD) levels and may also include diverse data types required for data broadcasting. Also, the known data correspond to data pre-known in accordance with a pre-arranged agreement between the receiving system and the transmitting system.

Additionally, among the terms used in the present invention, "MH" corresponds to the initials of "mobile" and "handheld" and represents the opposite concept of a fixed-type system. Furthermore, the MH service data may include at least one of mobile service data and handheld service data, and will also be referred to as "mobile service data" for simplicity. Herein, the mobile service data not only correspond to MH service data but may also include any type of service data with mobile or portable characteristics. Therefore, the mobile service data according to the present invention are not limited only to the MH service data.

The above-described mobile service data may correspond to data having information, such as program execution files, stock information, and so on, and may also correspond to A/V data. Most particularly, the mobile service data may correspond to A/V data having lower resolution and lower data rate as compared to the main service data. For example, if an A/V codec that is used for a conventional main service corresponds to a MPEG-2 codec, a MPEG-4 advanced video coding (AVC) or scalable video coding (SVC) having better image compression efficiency may be used as the A/V codec for the mobile service. Furthermore, any type of data may be transmitted as the mobile service data. For example, transport protocol expert group (TPEG) data for broadcasting real-time transportation information may be transmitted as the main service data.

Also, a data service using the mobile service data may include weather forecast services, traffic information services, stock information services, viewer participation quiz programs, real-time polls and surveys, interactive education broadcast programs, gaming services, services providing information on synopsis, character, background music, and filming sites of soap operas or series, services providing information on past match scores and player profiles and achievements, and services providing information on product information and programs classified by service, medium, time, and theme enabling purchase orders to be processed. Herein, the present invention is not limited only to the services mentioned above.

In the present invention, the transmitting system provides backward compatibility in the main service data so as to be received by the conventional receiving system. Herein, the main service data and the mobile service data are multiplexed to the same physical channel and then transmitted.

Furthermore, the digital broadcast transmitting system according to the present invention performs additional encoding on the mobile service data and inserts the data already known by the receiving system and transmitting system (e.g., known data), thereby transmitting the processed data.

Therefore, when using the transmitting system according to the present invention, the receiving system may receive the mobile service data during a mobile state and may also receive the mobile service data with stability despite various distortion and noise occurring within the channel.

Receiving System

FIG. 1 illustrates a block diagram showing a general structure of a digital broadcasting receiving system according to an embodiment of the present invention. The digital broadcast receiving system according to the present invention includes a baseband processor 100, a management processor 200, and a presentation processor 300.

The baseband processor 100 includes an operation controller 110, a tuner 120, a demodulator 130, an equalizer 140, a known sequence detector (or known data detector) 150, a block decoder (or mobile handheld block decoder) 160, a primary Reed-Solomon (RS) frame decoder 170, a secondary RS frame decoder 180, and a signaling decoder 190. The operation controller 110 controls the operation of each block included in the baseband processor 100.

By tuning the receiving system to a specific physical channel frequency, the tuner 120 enables the receiving system to receive main service data, which correspond to broadcast signals for fixed-type broadcast receiving systems, and mobile service data, which correspond to broadcast signals for mobile broadcast receiving systems. At this point, the tuned frequency of the specific physical channel is downconverted to an intermediate frequency (IF) signal, thereby being outputted to the demodulator 130 and the known sequence detector 140. The passband digital IF signal being outputted from the tuner 120 may only include main service data, or only include mobile service data, or include both main service data and mobile service data.

The demodulator 130 performs self-gain control, carrier wave recovery, and timing recovery processes on the passband digital IF signal inputted from the tuner 120, thereby modifying the IF signal to a baseband signal. Then, the demodulator 130 outputs the baseband signal to the equalizer 140 and the known sequence detector 150. The demodulator 130 uses the known data symbol sequence inputted from the known sequence detector 150 during the timing and/or carrier wave recovery, thereby enhancing the demodulating performance.

The equalizer 140 compensates channel-associated distortion included in the signal demodulated by the demodulator 130. Then, the equalizer 140 outputs the distortion-compensated signal to the block decoder 160. By using a known data symbol sequence inputted from the known sequence detector 150, the equalizer 140 may enhance the equalizing performance. Furthermore, the equalizer 140 may receive feedback on the decoding result from the block decoder 160, thereby enhancing the equalizing performance.

The known sequence detector 150 detects known data place (or position) inserted by the transmitting system from the input/output data (i.e., data prior to being demodulated or data being processed with partial demodulation). Then, the known sequence detector 150 outputs the detected known data position information and known data sequence generated from the detected position information to the demodulator 130 and the equalizer 140. Additionally, in order to allow the block decoder 160 to identify the mobile service data that have been processed with additional encoding by the transmitting system and the main service data that have not been processed with any additional encoding, the known sequence detector 150 outputs such corresponding information to the block decoder 160.

If the data channel-equalized by the equalizer 140 and inputted to the block decoder 160 correspond to data processed with both block-encoding and trellis-encoding by the transmitting system (i.e., data within the RS frame, signaling data), the block decoder 160 may perform trellis-decoding and block-decoding as inverse processes of the transmitting system. On the other hand, if the data channel-equalized by the equalizer 140 and inputted to the block decoder 160 correspond to data processed only with trellis-encoding and not block-encoding by the transmitting system (i.e., main service data), the block decoder 160 may perform only trellis-decoding.

The signaling decoder 190 decoded signaling data that have been channel-equalized and inputted from the equalizer 140. It is assumed that the signaling data inputted to the signaling decoder 190 correspond to data processed with both block-encoding and trellis-encoding by the transmitting system. Examples of such signaling data may include transmission parameter channel (TPC) data and fast information channel (FIC) data. Each type of data will be described in more detail in a later process. The FIC data decoded by the signaling decoder 190 are outputted to the FIC handler 215. And, the TPC data decoded by the signaling decoder 190 are outputted to the TPC handler 214.

Meanwhile, according to the present invention, the transmitting system uses RS frames by encoding units. Herein, the RS frame may be divided into a primary RS frame and a secondary RS frame. However, according to the embodiment of the present invention, the primary RS frame and the secondary RS frame will be divided based upon the level of importance of the corresponding data.

The primary RS frame decoder 170 receives the data outputted from the block decoder 160. At this point, according to the embodiment of the present invention, the primary RS frame decoder 170 receives only the mobile service data that have been Reed-Solomon (RS)-encoded and/or cyclic redundancy check (CRC)-encoded from the block decoder 160.

Herein, the primary RS frame decoder 170 receives only the mobile service data and not the main service data. The primary RS frame decoder 170 performs inverse processes of an RS frame encoder (not shown) included in the digital broadcast transmitting system, thereby correcting errors existing within the primary RS frame. More specifically, the primary RS frame decoder 170 forms a primary RS frame by grouping a plurality of data groups and, then, correct errors in primary RS frame units. In other words, the primary RS frame decoder 170 decodes primary RS frames, which are being transmitted for actual broadcast services.

Additionally, the secondary RS frame decoder 180 receives the data outputted from the block decoder 160. At this point, according to the embodiment of the present invention, the secondary RS frame decoder 180 receives only the mobile service data that have been RS-encoded and/or CRC-encoded from the block decoder 160. Herein, the secondary RS frame decoder 180 receives only the mobile service data and not the main service data. The secondary RS frame decoder 180 performs inverse processes of an RS frame encoder (not shown) included in the digital broadcast transmitting system, thereby correcting errors existing within the secondary RS frame. More specifically, the secondary RS frame decoder 180 forms a secondary RS frame by grouping a plurality of data groups and, then, correct errors in secondary RS frame units. In other words, the secondary RS frame decoder 180 decodes secondary RS frames, which are being transmitted for mobile audio service data, mobile video service data, guide data, and so on.

Meanwhile, the management processor 200 according to an embodiment of the present invention includes an MH physical adaptation processor 210, an IP network stack 220, a streaming handler 230, a system information (SI) handler 240, a file handler 250, a multi-purpose internet main extensions (MIME) type handler 260, and an electronic service guide (ESG) handler 270, and an ESG decoder 280, and a storage unit 290.

The MH physical adaptation processor 210 includes a primary RS frame handler 211, a secondary RS frame handler 212, an MH transport packet (TP) handler 213, a TPC handler 214, an FIC handler 215, and a physical adaptation control signal handler 216.

The TPC handler 214 receives and processes baseband information required by modules corresponding to the MH physical adaptation processor 210. The baseband information is inputted in the form of TPC data. Herein, the TPC handler 214 uses this information to process the FIC data, which have been sent from the baseband processor 100.

The TPC data are transmitted from the transmitting system to the receiving system via a predetermined region of a data group. The TPC data may include at least one of an MH ensemble ID, an MH sub-frame number, a total number of MH groups (TNoG), an RS frame continuity counter, a column size of RS frame (N), and an FIC version number.

Herein, the MH ensemble ID indicates an identification number of each MH ensemble carried in the corresponding channel. The MH sub-frame number signifies a number identifying the MH sub-frame number in an MH frame, wherein each MH group associated with the corresponding MH ensemble is transmitted. The TNoG represents the total number of MH groups including all of the MH groups belonging to all MH parades included in an MH sub-frame.

The RS frame continuity counter indicates a number that serves as a continuity counter of the RS frames carrying the corresponding MH ensemble. Herein, the value of the RS frame continuity counter shall be incremented by 1 modulo 16 for each successive RS frame.

N represents the column size of an RS frame belonging to the corresponding MH ensemble. Herein, the value of N determines the size of each MH TP.

Finally, the FIC version number signifies the version number of an FIC body carried on the corresponding physical channel.

As described above, diverse TPC data are inputted to the TPC handler 214 via the signaling decoder 190 shown in FIG. 1. Then, the received TPC data are processed by the TPC handler 214. The received TPC data may also be used by the FIC handler 215 in order to process the FIC data.

The FIC handler 215 processes the FIC data by associating the FIC data received from the baseband processor 100 with the TPC data.

The physical adaptation control signal handler 216 collects FIC data received through the FIC handler 215 and SI data received through RS frames. Then, the physical adaptation control signal handler 216 uses the collected FIC data and SI data to configure and process IP datagrams and access information of mobile broadcast services. Thereafter, the physical adaptation control signal handler 216 stores the processed IP datagrams and access information to the storage unit 290.

The primary RS frame handler 211 identifies primary RS frames received from the primary RS frame decoder 170 of the baseband processor 100 for each row unit, so as to configure an MH TP. Thereafter, the primary RS frame handler 211 outputs the configured MH TP to the MH TP handler 213.

The secondary RS frame handler 212 identifies secondary RS frames received from the secondary RS frame decoder 180 of the baseband processor 100 for each row unit, so as to configure an MH TP. Thereafter, the secondary RS frame handler 212 outputs the configured MH TP to the MH TP handler 213.

The MH transport packet (TP) handler 213 extracts a header from each MH TP received from the primary RS frame handler 211 and the secondary RS frame handler 212, thereby determining the data included in the corresponding MH TP. Then, when the determined data correspond to SI data (i.e., SI data that are not encapsulated to IP datagrams), the corresponding data are outputted to the physical adaptation control signal handler 216. Alternatively, when the determined data correspond to an IP datagram, the corresponding data are outputted to the IP network stack 220.

The IP network stack 220 processes broadcast data that are being transmitted in the form of IP datagrams. More specifically, the IP network stack 220 processes data that are inputted via user datagram protocol (UDP), real-time transport protocol (RTP), real-time transport control protocol (RTCP), asynchronous layered coding/layered coding transport (ALC/LCT), file delivery over unidirectional transport (FLUTE), and so on. Herein, when the processed data correspond to streaming data, the corresponding data are outputted to the streaming handler 230. And, when the processed data correspond to data in a file format, the corresponding data are outputted to the file handler 250. Finally, when the processed data correspond to SI-associated data, the corresponding data are outputted to the SI handler 240.

The SI handler 240 receives and processes SI data having the form of IP datagrams, which are inputted to the IP network stack 220. When the inputted data associated with SI correspond to MIME-type data, the inputted data are outputted to the MIME-type handler 260. The MIME-type handler 260 receives the MIME-type SI data outputted from the SI handler 240 and processes the received MIME-type SI data.

The file handler 250 receives data from the IP network stack 220 in an object format in accordance with the ALC/LCT and FLUTE structures. The file handler 250 groups the received data to create a file format. Herein, when the corresponding file includes ESG, the file is outputted to the ESG handler 270. On the other hand, when the corresponding file includes data for other file-based services, the file is outputted to the presentation controller 330 of the presentation processor 300.

The ESG handler 270 processes the ESG data received from the file handler 250 and stores the processed ESG data to the storage unit 290. Alternatively, the ESG handler 270 may output the processed ESG data to the ESG decoder 280, thereby allowing the ESG data to be used by the ESG decoder 280.

The storage unit 290 stores the system information (SI) received from the physical adaptation control signal handler 210 and the ESG handler 270 therein. Thereafter, the storage unit 290 transmits the stored SI data to each block.

The ESG decoder 280 either recovers the ESG data and SI data stored in the storage unit 290 or recovers the ESG data transmitted from the ESG handler 270. Then, the ESG decoder 280 outputs the recovered data to the presentation controller 330 in a format that can be outputted to the user.

The streaming handler 230 receives data from the IP network stack 220, wherein the format of the received data are in accordance with RTP and/or RTCP structures. The streaming handler 230 extracts audio/video streams from the received data, which are then outputted to the audio/video (A/V) decoder 310 of the presentation processor 300. The audio/video decoder 310 then decodes each of the audio stream and video stream received from the streaming handler 230.

The display module 320 of the presentation processor 300 receives audio and video signals respectively decoded by the A/V decoder 310. Then, the display module 320 provides the received audio and video signals to the user through a speaker and/or a screen.

The presentation controller 330 corresponds to a controller managing modules that output data received by the receiving system to the user.

The channel service manager 340 manages an interface with the user, which enables the user to use channel-based broadcast services, such as channel map management, channel service connection, and so on.

The application manager 350 manages an interface with a user using ESG display or other application services that do not correspond to channel-based services.

Meanwhile, the streaming handler 230 may include a buffer temporarily storing audio/video data. The digital broadcasting reception system periodically sets reference time information to a system time clock, and then the stored audio/video data can be transferred to A/V decoder 310 at a constant bitrate. Accordingly, the audio/video data can be processed at a bitrate and audio/video service can be provided.

Data Format Structure

Meanwhile, the data structure used in the mobile broadcasting technology according to the embodiment of the present invention may include a data group structure and an RS frame structure, which will now be described in detail.

Figure 2:
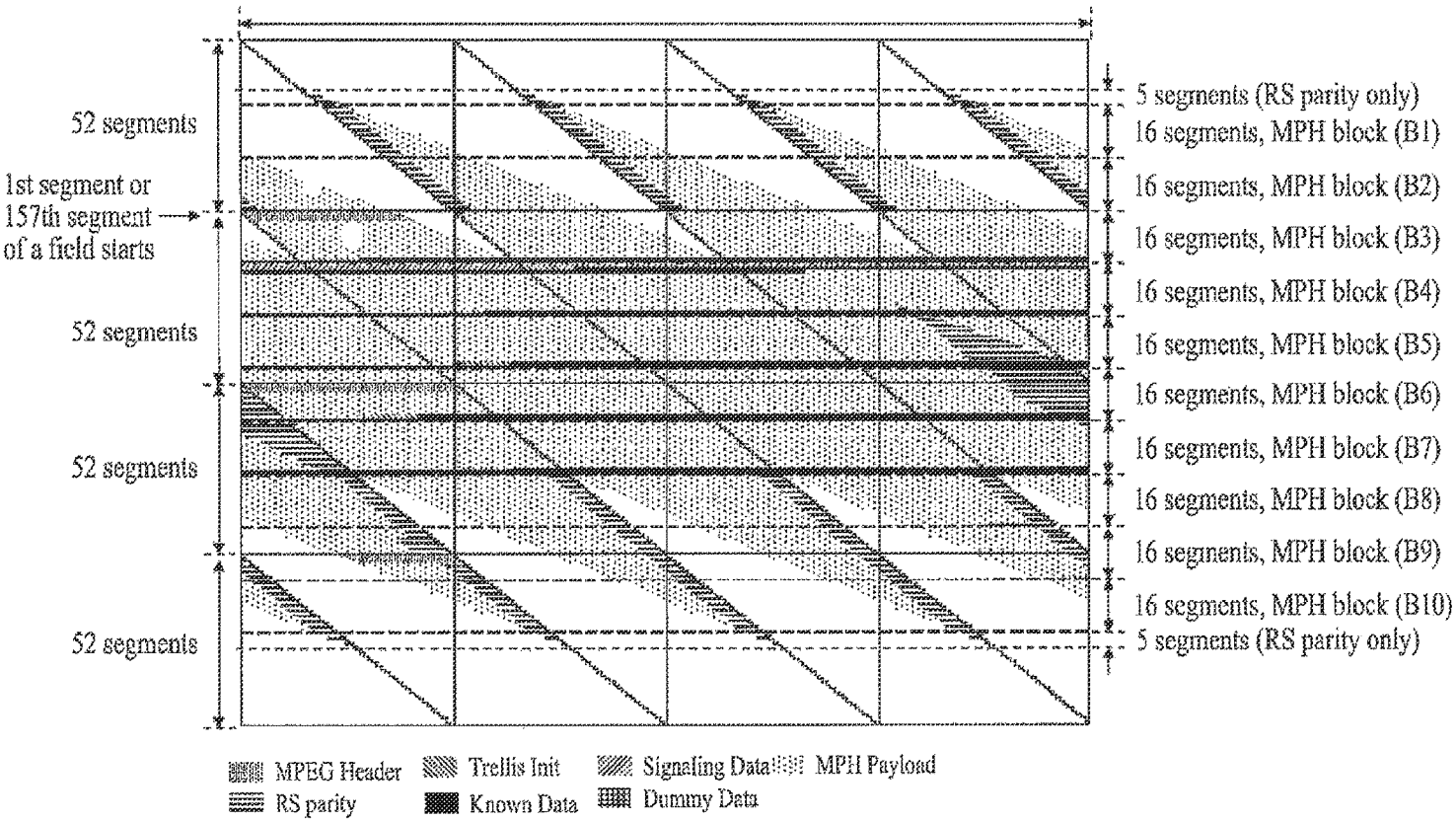
FIG. 2 illustrates an exemplary structure of a data group according to the present invention.

FIG. 2 illustrates an exemplary structure of a data group according to the present invention.

FIG. 2 shows an example of dividing a data group according to the data structure of the present invention into 10 MH blocks. In this example, each MH block has the length of 16 segments. Referring to FIG. 2, only the RS parity data are allocated to portions of the first 5 segments of the MH block 1 (B1) and the last 5 segments of the MH block 10 (B10). The RS parity data are excluded in regions A to D of the data group.

More specifically, when it is assumed that one data group is divided into regions A, B, C, and D, each MH block may be included in any one of region A to region D depending upon the characteristic of each MH block within the data group.

Herein, the data group is divided into a plurality of regions to be used for different purposes. More specifically, a region of the main service data having no interference or a very low interference level may be considered to have a more resistant (or stronger) receiving performance as compared to regions having higher interference levels. Additionally, when using a system inserting and transmitting known data in the data group, wherein the known data are known based upon an agreement between the transmitting system and the receiving system, and when consecutively long known data are to be periodically inserted in the mobile service data, the known data having a predetermined length may be periodically inserted in the region having no interference from the main service data (i.e., a region wherein the main service data are not mixed). However, due to interference from the main service data, it is difficult to periodically insert known data and also to insert consecutively long known data to a region having interference from the main service data.

Referring to FIG. 2, MH block 4 (B4) to MH block 7 (B7) correspond to regions without interference of the main service data. MH block 4 (B4) to MH block 7 (B7) within the data group shown in FIG. 2 correspond to a region where no interference from the main service data occurs. In this example, a long known data sequence is inserted at both the beginning and end of each MH block. In the description of the present invention, the region including MH block 4 (B4) to MH block 7 (B7) will be referred to as "region A (=B4+B5+B6+B7)". As described above, when the data group includes region A having a long known data sequence inserted at both the beginning and end of each MH block, the receiving system is capable of performing equalization by using the channel information that can be obtained from the known data. Therefore, the strongest equalizing performance may be yielded (or obtained) from one of region A to region D.

In the example of the data group shown in FIG. 2, MH block 3 (B3) and MH block 8 (B8) correspond to a region having little interference from the main service data. Herein, a long known data sequence is inserted in only one side of each MH block B3 and B8. More specifically, due to the interference from the main service data, a long known data sequence is inserted at the end of MH block 3 (B3), and another long known data sequence is inserted at the beginning of MH block 8 (B8). In the present invention, the region including MH block 3 (B3) and MH block 8 (B8) will be referred to as "region B (=B3+B8)". As described above, when the data group includes region B having a long known data sequence inserted at only one side (beginning or end) of each MH block, the receiving system is capable of performing equalization by using the channel information that can be obtained from the known data. Therefore, a stronger equalizing performance as compared to region C/D may be yielded (or obtained).

Referring to FIG. 2, MH block 2 (B2) and MH block 9 (B9) correspond to a region having more interference from the main service data as compared to region B. A long known data sequence cannot be inserted in any side of MH block 2 (B2) and MH block 9 (B9). Herein, the region including MH block 2 (B2) and MH block 9 (B9) will be referred to as "region C (=B2+B9)".

Finally, in the example shown in FIG. 2, MH block 1 (B1) and MH block 10 (B10) correspond to a region having more interference from the main service data as compared to region C. Similarly, a long known data sequence cannot be inserted in any side of MH block 1 (B1) and MH block 10 (B10). Herein, the region including MH block 1 (B1) and MH block 10 (B10) will be referred to as "region D (=B1+B10)". Since region C/D is spaced further apart from the known data sequence, when the channel environment undergoes frequent and abrupt changes, the receiving performance of region C/D may be deteriorated.

Additionally, the data group includes a signaling information area wherein signaling information is assigned (or allocated).

In the present invention, the signaling information area may start from the $1^{st}$ segment of the $4^{th}$ MH block (B4) to a portion of the $2^{nd}$ segment.

According to an embodiment of the present invention, the signaling information area for inserting signaling information may start from the $1^{st}$ segment of the $4^{th}$ MH block (B4) to a portion of the $2^{nd}$ segment. More specifically, 276 (=207+69) bytes of the $4^{th}$ MH block (B4) in each data group are assigned as the signaling information area. In other words, the signaling information area consists of 207 bytes of the $1^{st}$ segment and the first 69 bytes of the $2^{nd}$ segment of the $4^{th}$ MH block (B4). The $1^{st}$ segment of the $4^{th}$ MH block (B4) corresponds to the $17^{th}$ or $173^{rd}$ segment of a VSB field.

Herein, the signaling information may be identified by two different types of signaling channels: a transmission parameter channel (TPC) and a fast information channel (FIC).

Herein, the TPC data may include at least one of an MH ensemble ID, an MH sub-frame number, a total number of MH groups (TNoG), an RS frame continuity counter, a column size of RS frame (N), and an FIC version number. However, the TPC data (or information) presented herein are merely exemplary. And, since the adding or deleting of signaling information included in the TPC data may be easily adjusted and modified by one skilled in the art, the present invention will, therefore, not be limited to the examples set forth herein. Furthermore, the FIC is provided to enable a fast service acquisition of data receivers, and the FIC includes cross layer information between the physical layer and the upper layer(s). For example, when the data group includes 6 known data sequences, as shown in FIG. 2, the signaling information area is located between the first known data sequence and the second known data sequence. More specifically, the first known data sequence is inserted in the last 2 segments of the $3^{rd}$ MH block (B3), and the second known data sequence in inserted in the $2^{nd}$ and $3^{rd}$ segments of the $4^{th}$ MH block (B4). Furthermore, the $3^{rd}$ to $6^{th}$ known data sequences are respectively inserted in the last 2 segments of each of the $4^{th}$, $5^{th}$, $6^{th}$, and $7^{th}$ MH blocks (B4, B5, B6, and B7). The $1^{st}$ and $3^{rd}$ to $6^{th}$ known data sequences are spaced apart by 16 segments.

Figure 3:
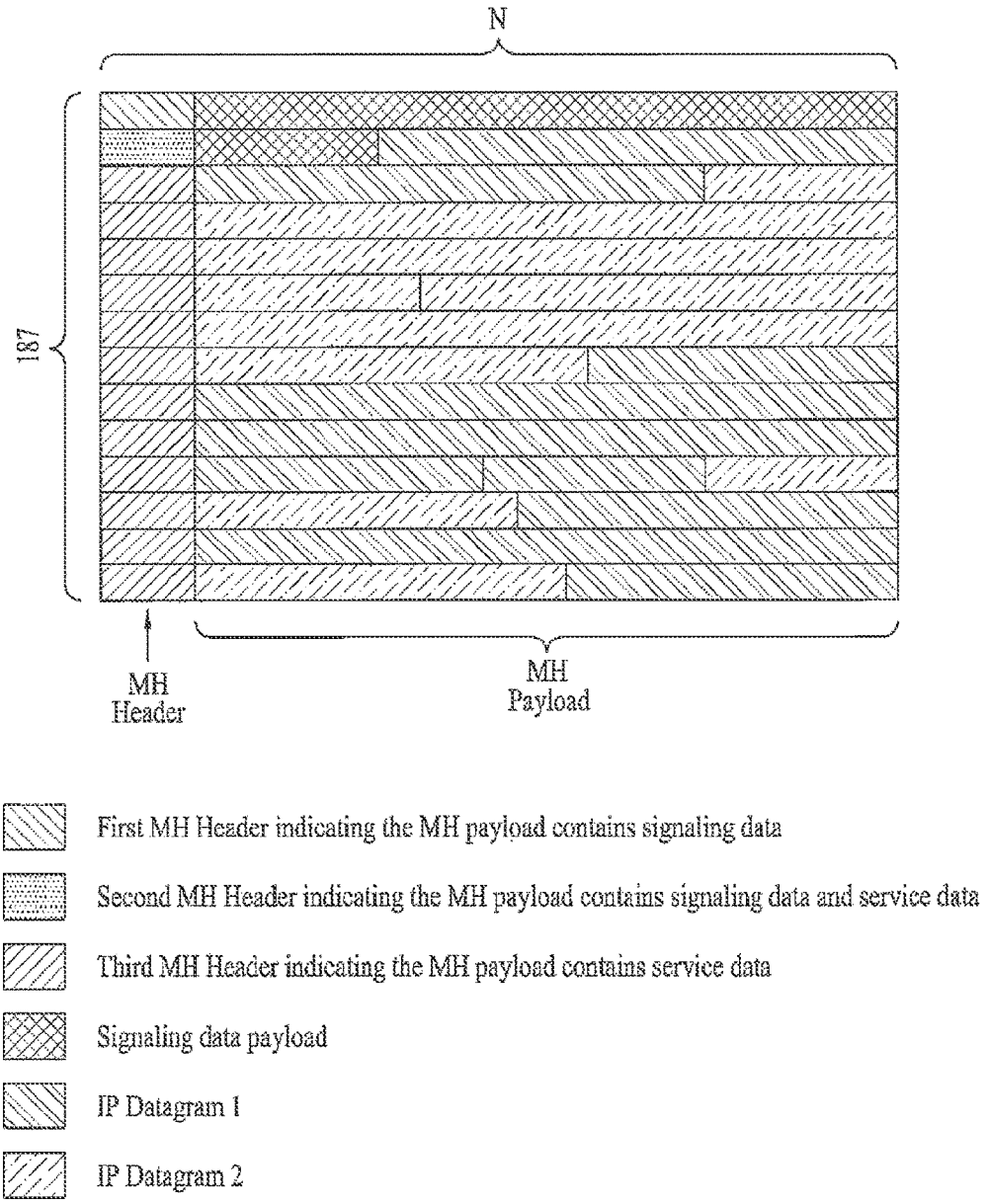
FIG. 3 illustrates an RS frame according to an embodiment of the present invention.

FIG. 3 illustrates an RS frame according to an embodiment of the present invention.

The RS frame shown in FIG. 3 corresponds to a collection of one or more data groups. The RS frame is received for each MH frame in a condition where the receiving system receives the FIC and processes the received FIC and where the receiving system is switched to a time-slicing mode so that the receiving system can receive MH ensembles including ESG entry points. Each RS frame includes IP streams of each service or ESG, and SMT section data may exist in all RS frames.

The RS frame according to the embodiment of the present invention consists of at least one MH transport packet (TP). Herein, the MH TP includes an MH header and an MH payload.

The MH payload may include mobile service data as well as signaling data. More specifically, an MH payload may include only mobile service data, or may include only signaling data, or may include both mobile service data and signaling data.

According to the embodiment of the present invention, the MH header may identify (or distinguish) the data types included in the MH payload. More specifically, when the MH TP includes a first MH header, this indicates that the MH payload includes only the signaling data. Also, when the MH TP includes a second MH header, this indicates that the MH payload includes both the signaling data and the mobile service data. Finally, when MH TP includes a third MH header, this indicates that the MH payload includes only the mobile service data.

In the example shown in FIG. 3, the RS frame is assigned with IP datagrams (IP datagram 1 and IP datagram 2) for two service types.

The IP datagram in the MH-TP in the RS frame may include reference time information (for example, network time stamp (NTP)), the detailed description for the reference time information will be disclosed by being referred to FIGS. 25 to 29.

Data Transmission Structure

Figure 4:
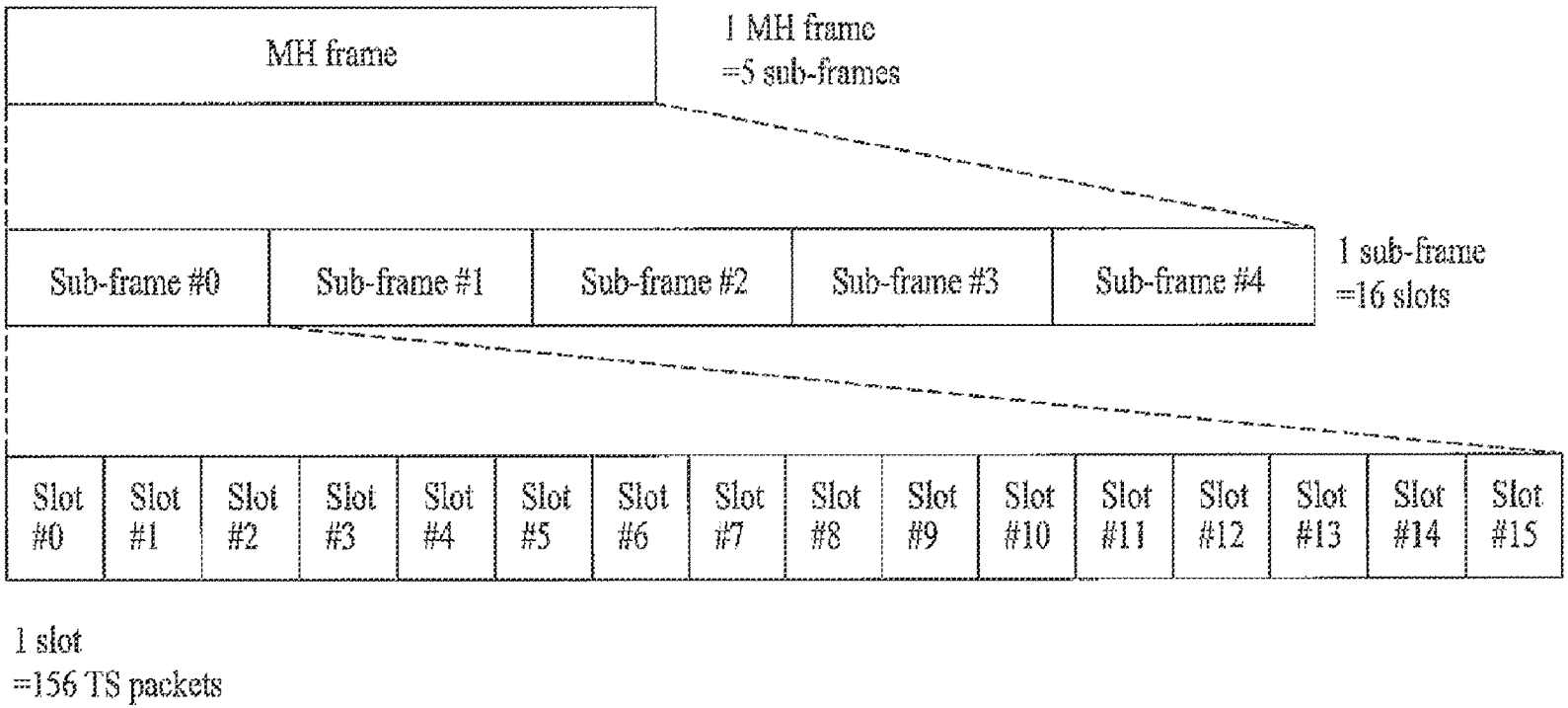
FIG. 4 illustrates an example of an MH frame structure for transmitting and receiving mobile service data according to the present invention.

FIG. 4 illustrates a structure of a MH frame for transmitting and receiving mobile service data according to the present invention.

In the example shown in FIG. 4, one MH frame consists of 5 sub-frames, wherein each sub-frame includes 16 slots. In this case, the MH frame according to the present invention includes 5 sub-frames and 80 slots.

Also, in a packet level, one slot is configured of 156 data packets (i.e., transport stream packets), and in a symbol level, one slot is configured of 156 data segments. Herein, the size of one slot corresponds to one half (½) of a VSB field. More specifically, since one 207-byte data packet has the same amount of data as a data segment, a data packet prior to being interleaved may also be used as a data segment. At this point, two VSB fields are grouped to form a VSB frame.

Figure 5:
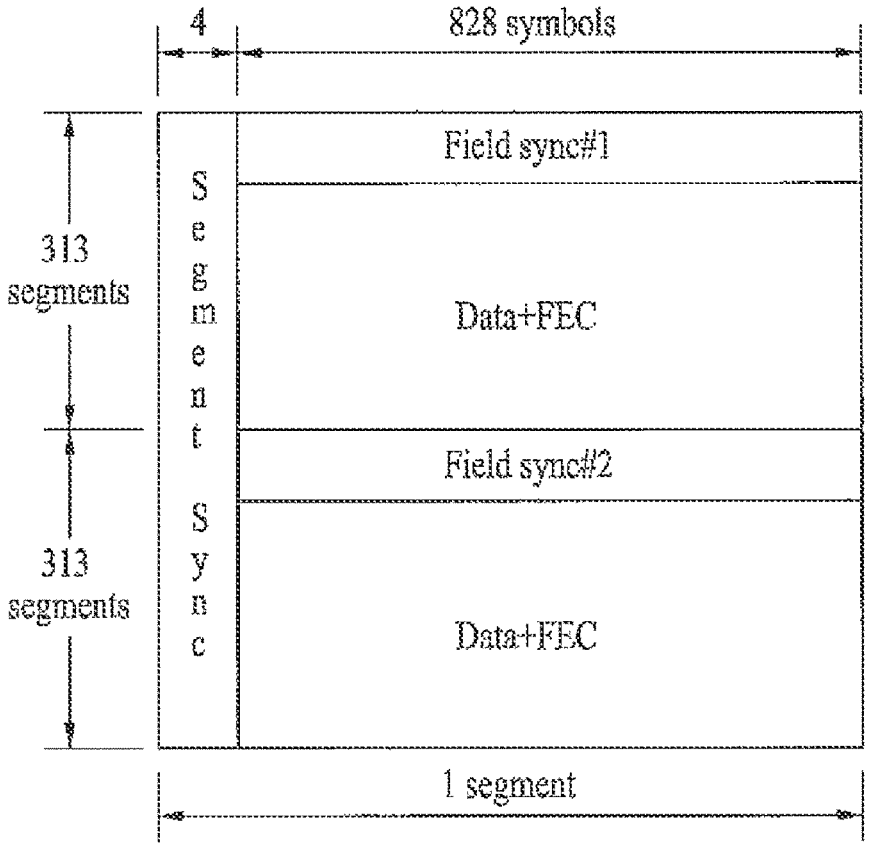
FIG. 5 illustrates an example of a general VSB frame structure.

FIG. 5 illustrates an exemplary structure of a VSB frame, wherein one VSB frame consists of 2 VSB fields (i.e., an odd field and an even field). Herein, each VSB field includes a field synchronization segment and 312 data segments. The slot corresponds to a basic time unit for multiplexing the mobile service data and the main service data. Herein, one slot may either include the mobile service data or be configured only of the main service data.

If the first 118 data packets within the slot correspond to a data group, the remaining 38 data packets become the main service data packets. In another example, when no data group exists in a slot, the corresponding slot is configured of 156 main service data packets.

Meanwhile, when the slots are assigned to a VSB frame, an off-set exists for each assigned position.

Figure 6:
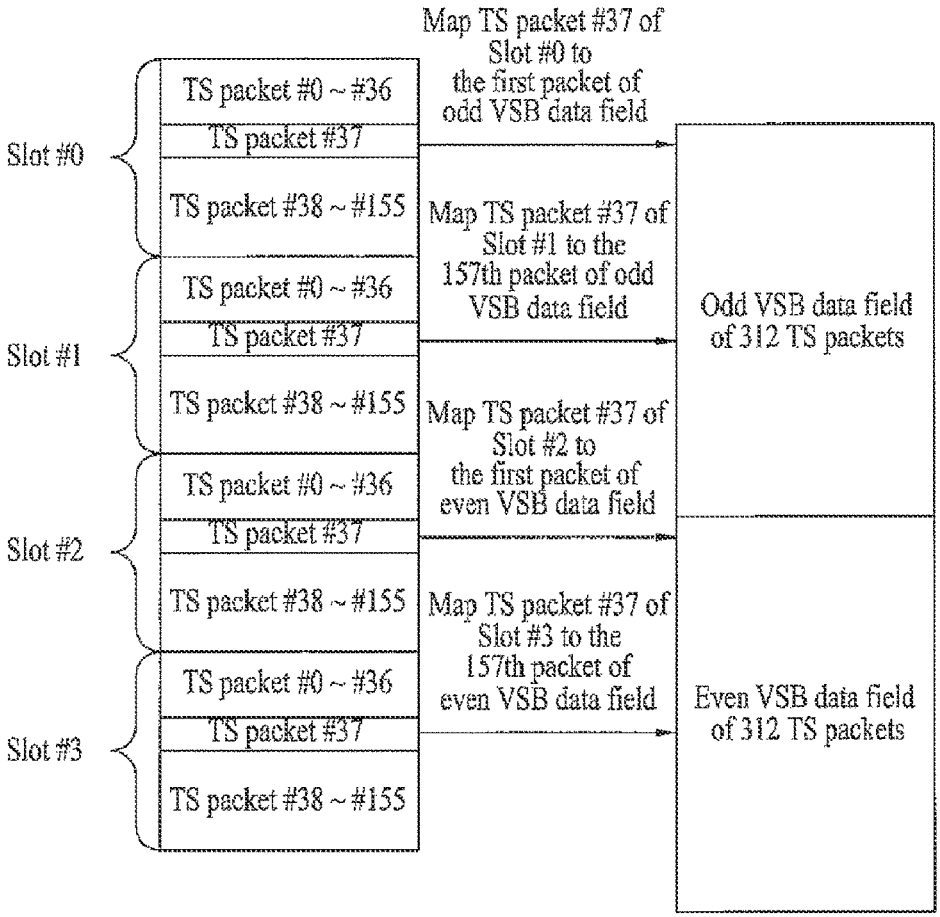
FIG. 6 illustrates a example of mapping positions of the first 4 slots of a sub-frame in a spatial area with respect to a VSB frame.

FIG. 6 illustrates a mapping example of the positions to which the first 4 slots of a sub-frame are assigned with respect to a VSB frame in a spatial area. And, FIG. 7 illustrates a mapping example of the positions to which the first 4 slots of a sub-frame are assigned with respect to a VSB frame in a chronological (or time) area.

Figure 7:
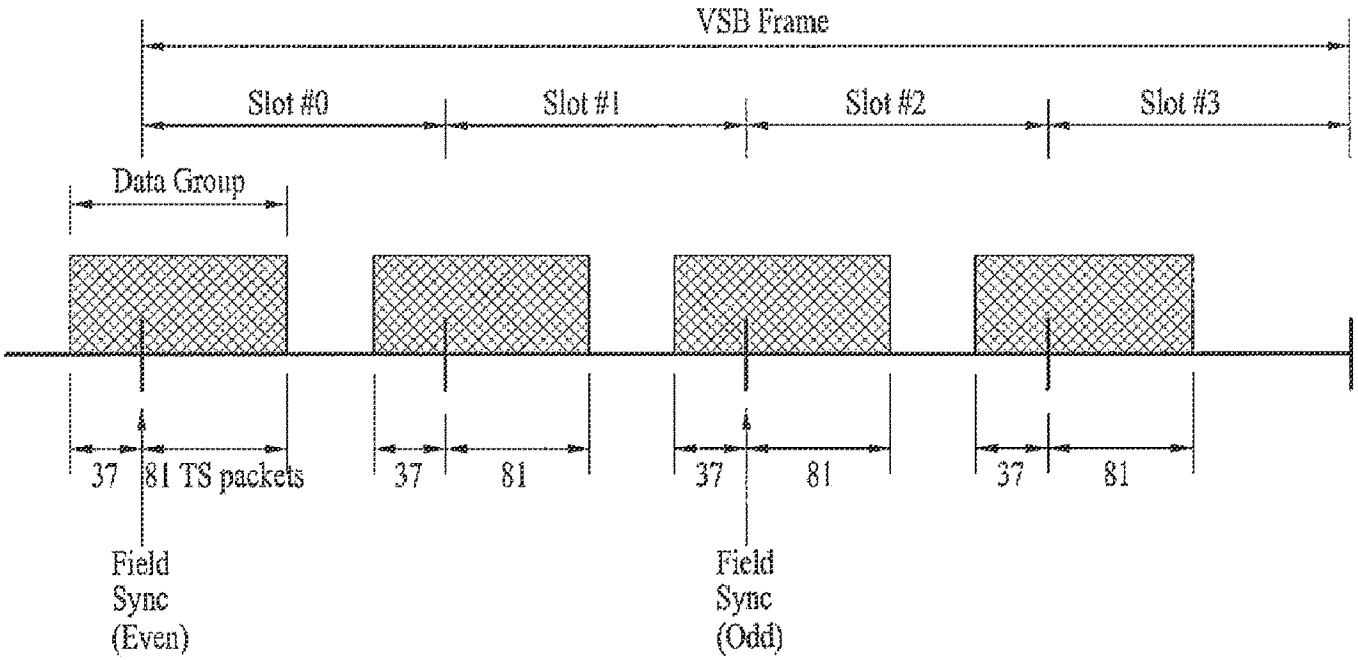
FIG. 7 illustrates a example of mapping positions of the first 4 slots of a sub-frame in a chronological (or time) area with respect to a VSB frame.

Referring to FIG. 6 and FIG. 7, a $38^{th}$ data packet (TS packet #37) of a $1^{st}$ slot (Slot #0) is mapped to the $1^{st}$ data packet of an odd VSB field. A $38^{th}$ data packet (TS packet #37) of a $2^{nd}$ slot (Slot #1) is mapped to the $157^{th}$ data packet of an odd VSB field. Also, a $38^{th}$ data packet (TS packet #37) of a $3^{rd}$ slot (Slot #2) is mapped to the $1^{st}$ data packet of an even VSB field. And, a $38^{th}$ data packet (TS packet #37) of a $4^{th}$ slot (Slot #3) is mapped to the $157^{th}$ data packet of an even VSB field. Similarly, the remaining 12 slots within the corresponding sub-frame are mapped in the subsequent VSB frames using the same method.

Figure 8:
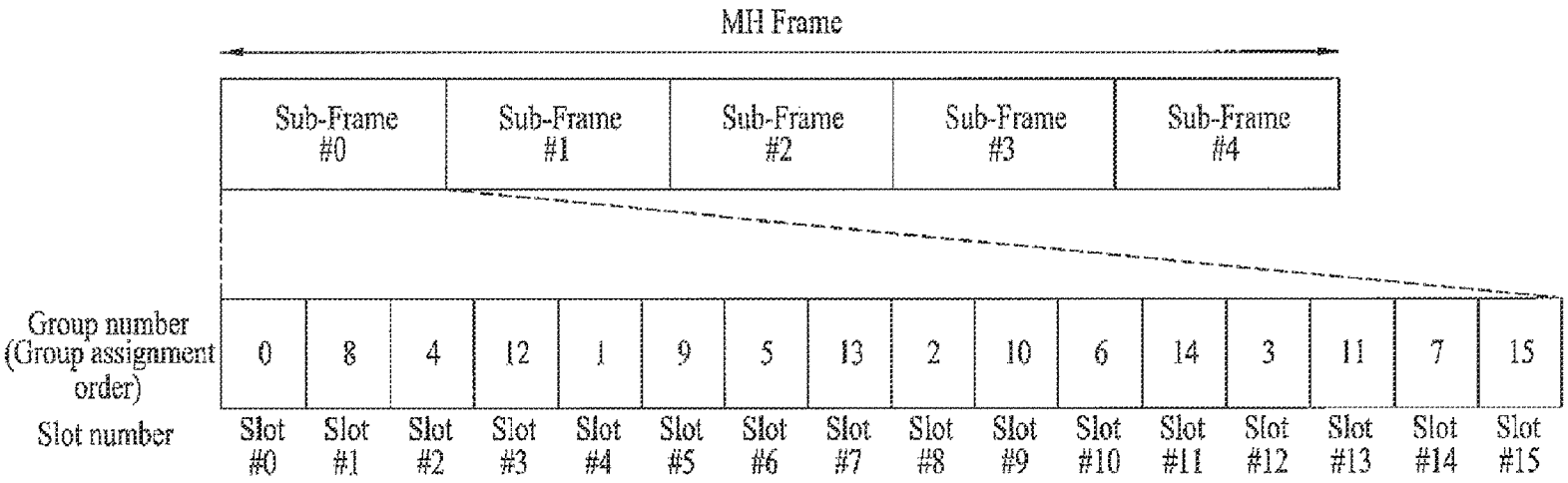
FIG. 8 illustrates an exemplary order of data groups being assigned to one of 5 sub-frames configuring an MH frame according to the present invention.

FIG. 8 illustrates an exemplary assignment order of data groups being assigned to one of 5 sub-frames, wherein the 5 sub-frames configure an MH frame. For example, the method of assigning data groups may be identically applied to all MH frames or differently applied to each MH frame. Furthermore, the method of assigning data groups may be identically applied to all sub-frames or differently applied to each sub-frame. At this point, when it is assumed that the data groups are assigned using the same method in all sub-frames of the corresponding MH frame, the total number of data groups being assigned to an MH frame is equal to a multiple of '5'.

According to the embodiment of the present invention, a plurality of consecutive data groups is assigned to be spaced as far apart from one another as possible within the MH frame. Thus, the system can be capable of responding promptly and effectively to any burst error that may occur within a sub-frame.

For example, when it is assumed that 3 data groups are assigned to a sub-frame, the data groups are assigned to a $1^{st}$ slot (Slot #0), a $5^{th}$ slot (Slot #4), and a $9^{th}$ slot (Slot #8) in the sub-frame, respectively. FIG. 8 illustrates an example of assigning 16 data groups in one sub-frame using the above-described pattern (or rule). In other words, each data group is serially assigned to 16 slots corresponding to the following numbers: 0, 8, 4, 12, 1, 9, 5, 13, 2, 10, 6, 14, 3, 11, 7, and 15. Equation 1 below shows the above-described rule (or pattern) for assigning data groups in a sub-frame.

$$j=(4i+0)\bmod 16 \qquad \text{[Equation 1]}$$

0=0 if i<4,
0=2 else if i<8,
Herein,
0=1 else if i<12,
0=3 else.

Herein, j indicates the slot number within a sub-frame. The value of j may range from 0 to 15 (i.e., $0 \le j \le 15$). Also, variable i indicates the data group number. The value of i may range from 0 to 15 (i.e., $0 \le i \le 15$).

In the present invention, a collection of data groups included in a MH frame will be referred to as a "parade". Based upon the RS frame mode, the parade transmits data of at least one specific RS frame.

The mobile service data within one RS frame may be assigned either to all of regions A/B/C/D within the corresponding data group, or to at least one of regions A/B/C/D. In the embodiment of the present invention, the mobile service data within one RS frame may be assigned either to all of regions A/B/C/D, or to at least one of regions NB and regions C/D. If the mobile service data are assigned to the latter case (i.e., one of regions NB and regions C/D), the RS frame being assigned to regions A/B and the RS frame being assigned to regions C/D within the corresponding data group are different from one another.

According to the embodiment of the present invention, the RS frame being assigned to regions A/B within the corresponding data group will be referred to as a "primary RS frame", and the RS frame being assigned to regions C/D within the corresponding data group will be referred to as a "secondary RS frame", for simplicity. Also, the primary RS frame and the secondary RS frame form (or configure) one parade. More specifically, when the mobile service data within one RS frame are assigned either to all of regions A/B/C/D within the corresponding data group, one parade transmits one RS frame. Conversely, when the mobile service data within one RS frame are assigned either to at least one of regions A/B and regions C/D, one parade may transmit up to 2 RS frames. More specifically, the RS frame mode indicates whether a parade transmits one RS frame, or whether the parade transmits two RS frames. Such RS frame mode is transmitted as the above-described TPC data. Table 1 below shows an example of the RS frame mode.

TABLE 1

| RS frame mode (2 bits) | Description |
|---|---|
| 00 | There is only one primary RS frame for all group regions |
| 01 | There are two separate RS frames.<br>Primary RS frame for group regions A and B<br>Secondary RS frame for group regions C and D |

TABLE 1-continued

| RS frame mode (2 bits) | Description |
|---|---|
| 10 | Reserved |
| 11 | Reserved |

Table 1 illustrates an example of allocating 2 bits in order to indicate the RS frame mode. For example, referring to Table 1, when the RS frame mode value is equal to '00', this indicates that one parade transmits one RS frame. And, when the RS frame mode value is equal to '01', this indicates that one parade transmits two RS frames, i.e., the primary RS frame and the secondary RS frame.

More specifically, when the RS frame mode value is equal to '01', data of the primary RS frame for regions NB are assigned and transmitted to regions NB of the corresponding data group. Similarly, data of the secondary RS frame for regions C/D are assigned and transmitted to regions C/D of the corresponding data group.

As described in the assignment of data groups, the parades are also assigned to be spaced as far apart from one another as possible within the sub-frame. Thus, the system can be capable of responding promptly and effectively to any burst error that may occur within a sub-frame. Furthermore, the method of assigning parades may be identically applied to all MH frames or differently applied to each MH frame.

According to the embodiment of the present invention, the parades may be assigned differently for each MH frame and identically for all sub-frames within an MH frame. More specifically, the MH frame structure may vary by MH frame units. Thus, an ensemble rate may be adjusted on a more frequent and flexible basis.

Figure 9:
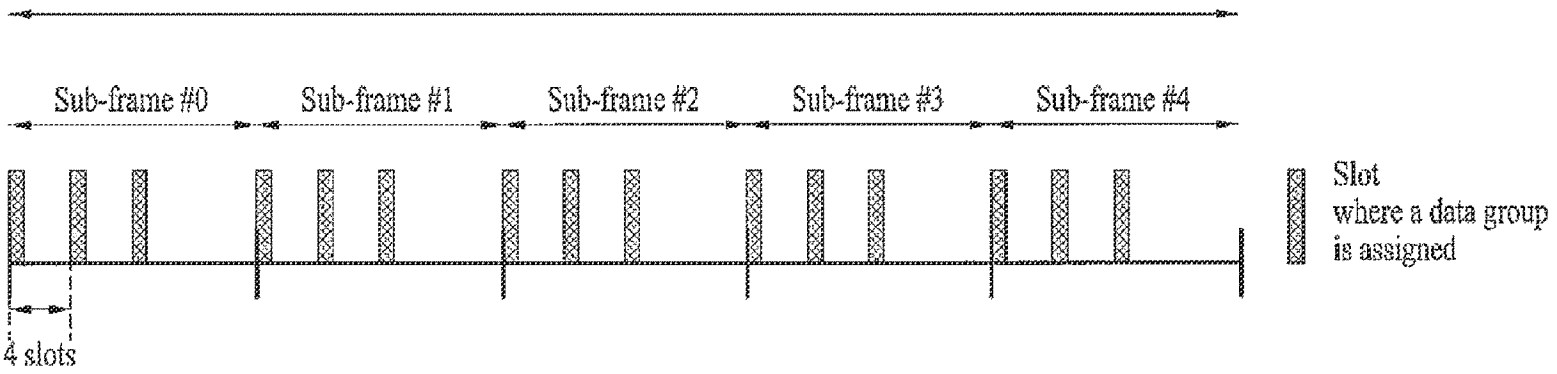
FIG. 9 illustrates an example of a single parade being assigned to an MH frame according to the present invention.

FIG. 9 illustrates an example of multiple data groups of a single parade being assigned (or allocated) to an MH frame. More specifically, FIG. 9 illustrates an example of a plurality of data groups included in a single parade, wherein the number of data groups included in a sub-frame is equal to '3', being allocated to an MH frame.

Referring to FIG. 9, 3 data groups are sequentially assigned to a sub-frame at a cycle period of 4 slots. Accordingly, when this process is equally performed in the 5 sub-frames included in the corresponding MH frame, 15 data groups are assigned to a single MH frame. Herein, the 15 data groups correspond to data groups included in a parade. Therefore, since one sub-frame is configured of 4 VSB frame, and since 3 data groups are included in a sub-frame, the data group of the corresponding parade is not assigned to one of the 4 VSB frames within a sub-frame.

For example, when it is assumed that one parade transmits one RS frame, and that a RS frame encoder (not shown) included in the transmitting system performs RS-encoding on the corresponding RS frame, thereby adding 24 bytes of parity data to the corresponding RS frame and transmitting the processed RS frame, the parity data occupy approximately 11.37% (=24/(187+24)×100) of the total code word length. Meanwhile, when one sub-frame includes 3 data groups, and when the data groups included in the parade are assigned, as shown in FIG. 9, a total of 15 data groups form an RS frame. Accordingly, even when an error occurs in an entire data group due to a burst noise within a channel, the percentile is merely 6.67% (=1/15×100). Therefore, the receiving system may correct all errors by performing an erasure RS decoding process. More specifically, when the erasure RS decoding is performed, a number of channel errors corresponding to the number of RS parity bytes may be corrected. By doing so, the receiving system may correct the error of at least one data group within one parade. Thus, the minimum burst noise length correctable by a RS frame is over 1 VSB frame.

Meanwhile, when data groups of a parade are assigned as shown in FIG. 9, either main service data may be assigned between each data group, or data groups corresponding to different parades may be assigned between each data group. More specifically, data groups corresponding to multiple parades may be assigned to one MH frame.

Basically, the method of assigning data groups corresponding to multiple parades is very similar to the method of assigning data groups corresponding to a single parade. In other words, data groups included in other parades that are to be assigned to an MH frame are also respectively assigned according to a cycle period of 4 slots.

At this point, data groups of a different parade may be sequentially assigned to the respective slots in a circular method. Herein, the data groups are assigned to slots starting from the ones to which data groups of the previous parade have not yet been assigned.

For example, when it is assumed that data groups corresponding to a parade are assigned as shown in FIG. 9, data groups corresponding to the next parade may be assigned to a sub-frame starting either from the $12^{th}$ slot of a sub-frame. However, this is merely exemplary. In another example, the data groups of the next parade may also be sequentially assigned to a different slot within a sub-frame at a cycle period of 4 slots starting from the $3^{rd}$ slot.

Figure 10:
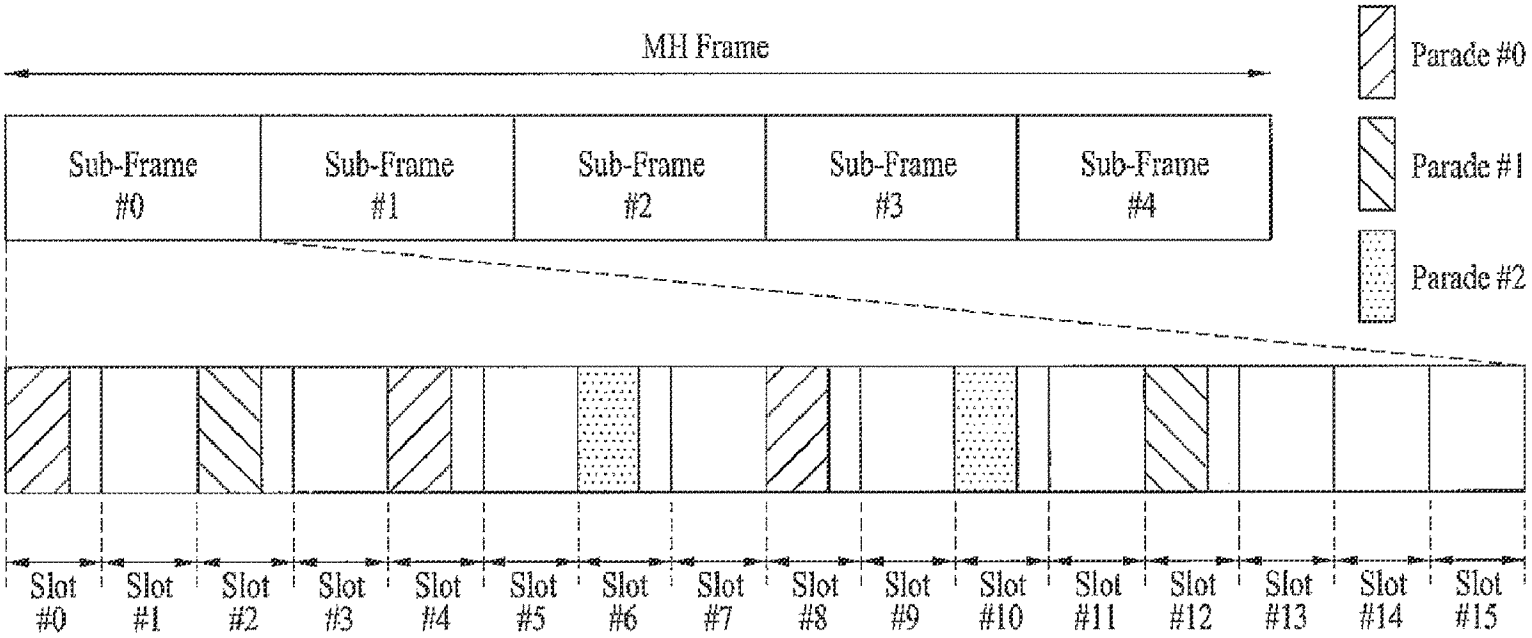
FIG. 10 illustrates an example of 3 parades being assigned to an MH frame according to the present invention.

FIG. 10 illustrates an example of transmitting 3 parades (Parade #0, Parade #1, and Parade #2) to an MH frame. More specifically, FIG. 10 illustrates an example of transmitting parades included in one of 5 sub-frames, wherein the 5 sub-frames configure one MH frame.

When the $1^{st}$ parade (Parade #0) includes 3 data groups for each sub-frame, the positions of each data groups within the sub-frames may be obtained by substituting values '0' to '2' for i in Equation 1. More specifically, the data groups of the $1^{st}$ parade (Parade #0) are sequentially assigned to the $1^{st}$, $5^{th}$, and $9^{th}$ slots (Slot #0, Slot #4, and Slot #8) within the sub-frame.

Also, when the $2^{nd}$ parade includes 2 data groups for each sub-frame, the positions of each data groups within the sub-frames may be obtained by substituting values '3' and '4' for i in Equation 1. More specifically, the data groups of the $2^{nd}$ parade (Parade #1) are sequentially assigned to the $2^{nd}$ and $12^{th}$ slots (Slot #3 and Slot #11) within the sub-frame.

Finally, when the $3^{rd}$ parade includes 2 data groups for each sub-frame, the positions of each data groups within the sub-frames may be obtained by substituting values '5' and '6' for i in Equation 1. More specifically, the data groups of the $3^{rd}$ parade (Parade #2) are sequentially assigned to the $7^{th}$ and $11^{th}$ slots (Slot #6 and Slot #10) within the sub-frame.

As described above, data groups of multiple parades may be assigned to a single MH frame, and, in each sub-frame, the data groups are serially allocated to a group space having 4 slots from left to right.

Therefore, a number of groups of one parade per sub-frame (NoG) may correspond to any one integer from '1' to '8'. Herein, since one MH frame includes 5 sub-frames, the total number of data groups within a parade that can be allocated to an MH frame may correspond to any one multiple of '5' ranging from '5' to '40'.

Figure 11:
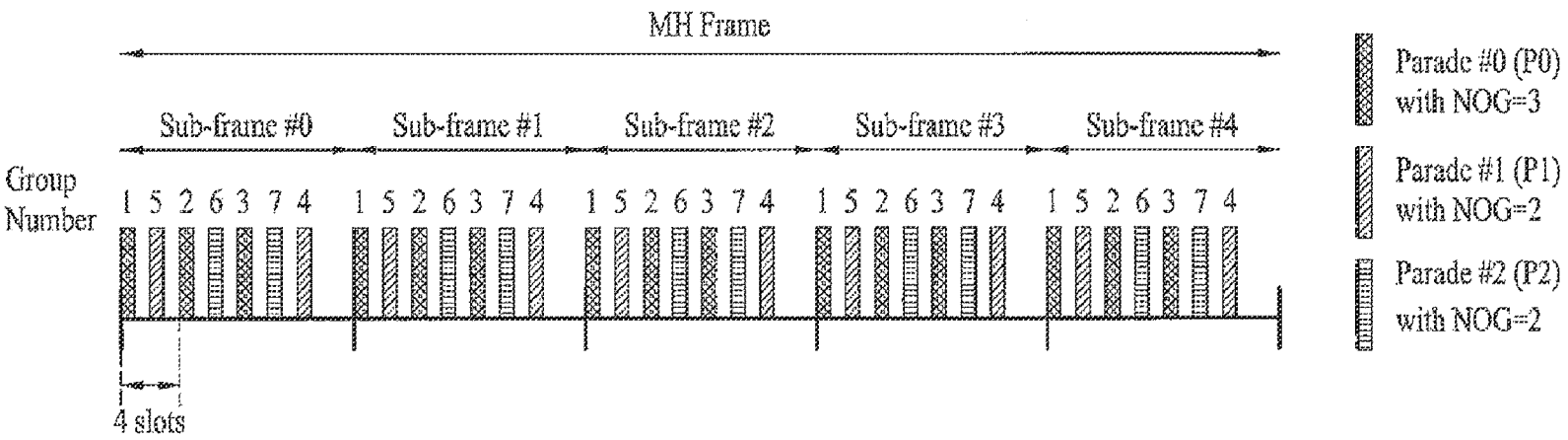
FIG. 11 illustrates an example of the process of assigning 3 parades shown in FIG. 10 being expanded to 5 sub-frames within an MH frame.

FIG. 11 illustrates an example of expanding the assignment process of 3 parades, shown in FIGS. 10, to 5 sub-frames within an MH frame.

Figure 12:
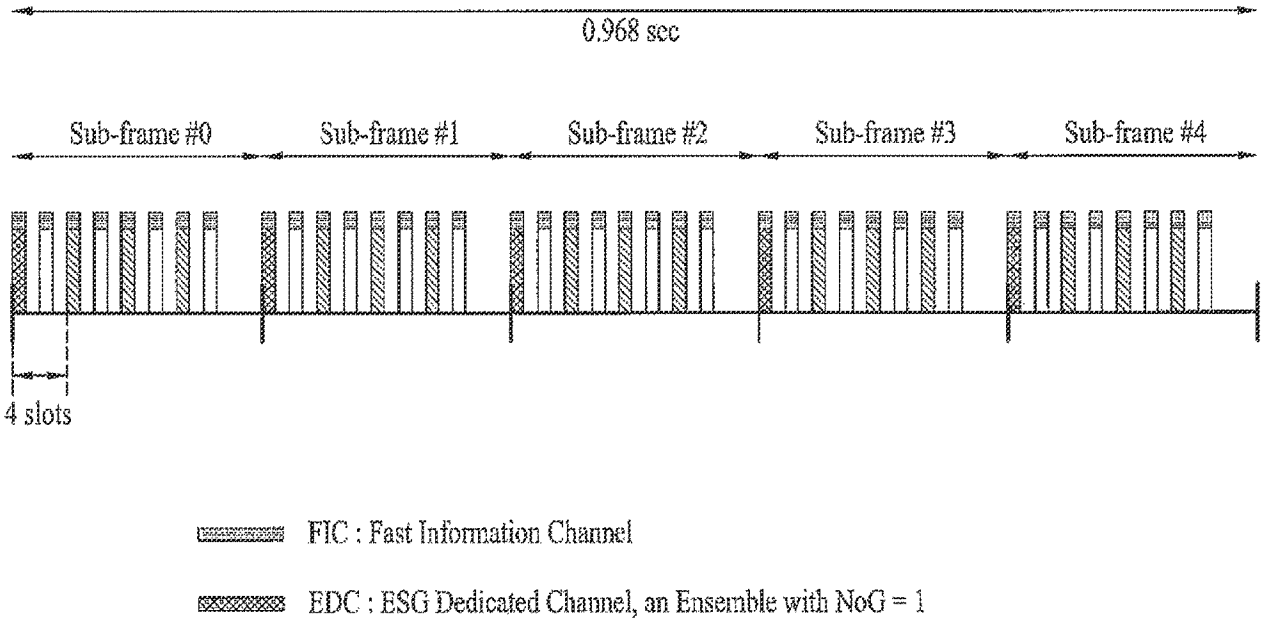
FIG. 12 illustrates a data transmission structure according to an embodiment of the present invention, wherein signaling data are included in a data group so as to be transmitted.

FIG. 12 illustrates a data transmission structure according to an embodiment of the present invention, wherein signaling data are included in a data group so as to be transmitted.

As described above, an MH frame is divided into 5 sub-frames. Data groups corresponding to a plurality of parades co-exist in each sub-frame. Herein, the data groups corresponding to each parade are grouped by MH frame units, thereby configuring a single parade. The data structure shown in FIG. 12 includes 3 parades, one ESG dedicated channel (EDC) parade (i.e., parade with NoG=1), and 2 service parades (i.e., parade with NoG=4 and parade with NoG=3). Also, a predetermined portion of each data group (i.e., 37 bytes/data group) is used for delivering (or sending) FIC information associated with mobile service data, wherein the FIC information is separately encoded from the RS-encoding process. The FIC region assigned to each data group consists of one FIC segments. Herein, each segment is interleaved by MH sub-frame units, thereby configuring an FIC body, which corresponds to a completed FIC transmission structure. However, whenever required, each segment may be interleaved by MH frame units and not by MH sub-frame units, thereby being completed in MH frame units.

Meanwhile, the concept of an MH ensemble is applied in the embodiment of the present invention, thereby defining a collection (or group) of services. Each MH ensemble carries the same QoS and is coded with the same FEC code. Also, each MH ensemble has the same unique identifier (i.e., ensemble ID) and corresponds to consecutive RS frames.

As shown in FIG. 12, the FIC segment corresponding to each data group described service information of an MH ensemble to which the corresponding data group belongs. When FIC segments within a sub-frame are grouped and deinterleaved, all service information of a physical channel through which the corresponding FICs are transmitted may be obtained. Therefore, the receiving system may be able to acquire the channel information of the corresponding physical channel, after being processed with physical channel tuning, during a sub-frame period.

Furthermore, FIG. 12 illustrates a structure further including a separate EDC parade apart from the service parade and wherein electronic service guide (ESG) data are transmitted in the $1^{st}$ slot of each sub-frame.

If the digital broadcasting reception system recognizes a frame start point or a frame end point of the MH frame (or the MH subframe), then the digital broadcasting reception system can set the reference time information to the system time clock at the frame start point or the frame end point. The reference time information can be the network time protocol (NTP) timestamp. The detailed description for the reference time information will be disclosed by being referred to FIGS. 25 to 29.

Hierarchical Signaling Structure

Figure 13:
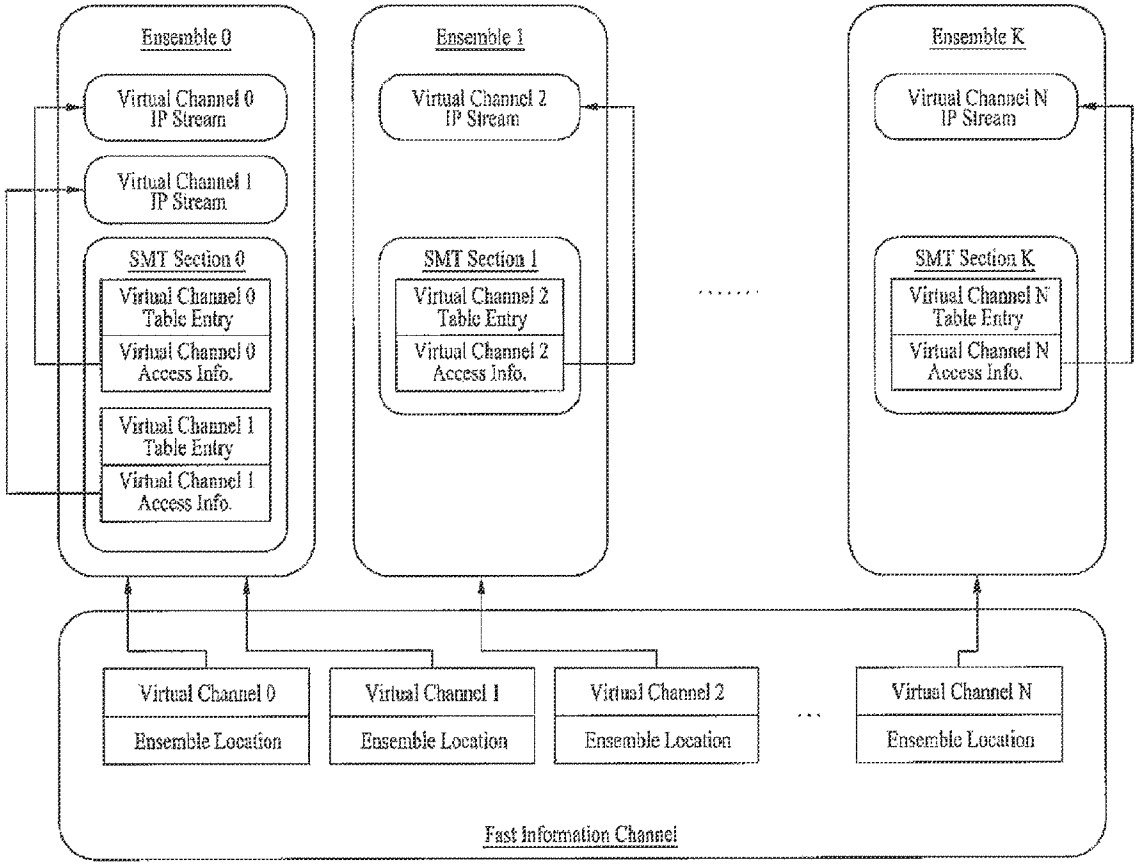
FIG. 13 illustrates a hierarchical signaling structure according to an embodiment of the present invention.

FIG. 13 illustrates a hierarchical signaling structure according to an embodiment of the present invention. As shown in FIG. 13, the mobile broadcasting technology according to the embodiment of the present invention adopts a signaling method using FIC and SMT. In the description of the present invention, the signaling structure will be referred to as a hierarchical signaling structure.

Hereinafter, a detailed description on how the receiving system accesses a virtual channel via FIC and SMT will now be given with reference to FIG. 13.

The FIC body defined in an MH transport (M1) identifies the physical location of each the data stream for each virtual channel and provides very high level descriptions of each virtual channel.

Being MH ensemble level signaling information, the service map table (SMT) provides MH ensemble level signaling information. The SMT provides the IP access information of each virtual channel belonging to the respective MH ensemble within which the SMT is carried. The SMT also provides all IP stream component level information required for the virtual channel service acquisition.

Referring to FIG. 13, each MH ensemble (i.e., Ensemble 0, Ensemble 1, . . . , Ensemble K) includes a stream information on each associated (or corresponding) virtual channel (e.g., virtual channel 0 IP stream, virtual channel 1 IP stream, and virtual channel 2 IP stream). For example, Ensemble 0 includes virtual channel 0 IP stream and virtual channel 1 IP stream. And, each MH ensemble includes diverse information on the associated virtual channel (i.e., Virtual Channel 0 Table Entry, Virtual Channel 0 Access Info, Virtual Channel 1 Table Entry, Virtual Channel 1 Access Info, Virtual Channel 2 Table Entry, Virtual Channel 2 Access Info, Virtual Channel N Table Entry, Virtual Channel N Access Info, and so on).

The FIC body payload includes information on MH ensembles (e.g., ensemble_id field, and referred to as "ensemble location" in FIG. 13) and information on a virtual channel associated with the corresponding MH ensemble (e.g., when such information corresponds to a major_channel_num field and a minor_channel_num field, the information is expressed as Virtual Channel 0, Virtual Channel 1, . . . , Virtual Channel N in FIG. 13).

The application of the signaling structure in the receiving system will now be described in detail.

When a user selects a channel he or she wishes to view (hereinafter, the user-selected channel will be referred to as "channel θ" for simplicity), the receiving system first parses the received FIC. Then, the receiving system acquires information on an MH ensemble (i.e., ensemble location), which is associated with the virtual channel corresponding to channel θ (hereinafter, the corresponding MH ensemble will be referred to as "MH ensemble θ" for simplicity). By acquiring slots only corresponding to the MH ensemble θ using the time-slicing method, the receiving system configures ensemble θ. The ensemble θ configured as described above, includes an SMT on the associated virtual channels (including channel θ) and IP streams on the corresponding virtual channels. Therefore, the receiving system uses the SMT included in the MH ensemble θ in order to acquire various information on channel θ (e.g., Virtual Channel θ Table Entry) and stream access information on channel θ (e.g., Virtual Channel θ Access Info). The receiving system uses the stream access information on channel θ to receive only the associated IP streams, thereby providing channel θ services to the user.

Fast Information Channel (FIC)

The digital broadcast receiving system according to the present invention adopts the fast information channel (FIC) for a faster access to a service that is currently being broadcasted.

More specifically, the FIC handler 215 of FIG. 1 parses the FIC body, which corresponds to an FIC transmission structure, and outputs the parsed result to the physical adaptation control signal handler 216.

Figure 14:
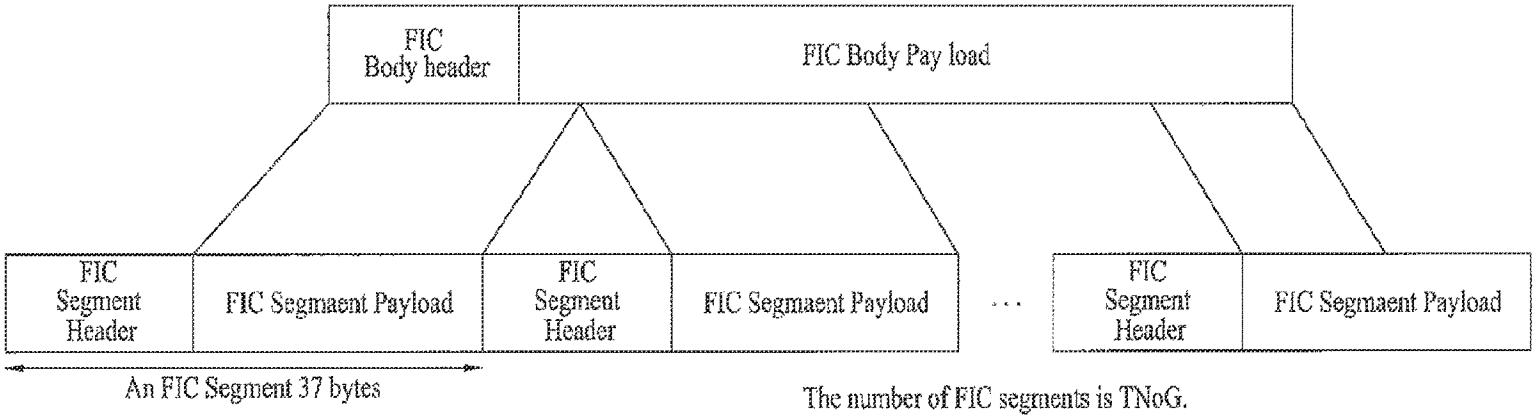
FIG. 14 illustrates an exemplary FIC body format according to an embodiment of the present invention.

FIG. 14 illustrates an exemplary FIC body format according to an embodiment of the present invention. According to the embodiment of the present invention, the FIC format consists of an FIC body header and an FIC body payload.

Meanwhile, according to the embodiment of the present invention, data are transmitted through the FIC body header and the FIC body payload in FIC segment units. Each FIC segment has the size of 37 bytes, and each FIC segment consists of a 2-byte FIC segment header and a 35-byte FIC segment payload. More specifically, an FIC body configured of an FIC body header and an FIC body payload is segmented in units of 35 data bytes, which are then carried in at least one FIC segment within the FIC segment payload, so as to be transmitted.

In the description of the present invention, an example of inserting one FIC segment in one data group, which is then transmitted, will be given. In this case, the receiving system receives a slot corresponding to each data group by using a time-slicing method.

The signaling decoder 190 included in the receiving system shown in FIG. 1 collects each FIC segment inserted in each data group. Then, the signaling decoder 190 uses the collected FIC segments to created a single FIC body. Thereafter, the signaling decoder 190 performs a decoding process on the FIC body payload of the created FIC body, so that the decoded FIC body payload corresponds to an encoded result of a signaling encoder (not shown) included in the transmitting system. Subsequently, the decoded FIC body payload is outputted to the FIC handler 215. The FIC handler 215 parses the FIC data included in the FIC body payload, and then outputs the parsed FIC data to the physical adaptation control signal handler 216. The physical adaptation control signal handler 216 uses the inputted FIC data to perform processes associated with MH ensembles, virtual channels, SMTs, and so on.

According to an embodiment of the present invention, when an FIC body is segmented, and when the size of the last segmented portion is smaller than 35 data bytes, it is assumed that the lacking number of data bytes in the FIC segment payload is completed with by adding the same number of stuffing bytes therein, so that the size of the last FIC segment can be equal to 35 data bytes.

However, it is apparent that the above-described data byte values (i.e., 37 bytes for the FIC segment, 2 bytes for the FIC segment header, and 35 bytes for the FIC segment payload) are merely exemplary, and will, therefore, not limit the scope of the present invention.

FIG. 15 illustrates an exemplary bit stream syntax structure with respect to an FIC segment according to an embodiment of the present invention.

Herein, the FIC segment signifies a unit used for transmitting the FIC data. The FIC segment consists of an FIC segment header and an FIC segment payload. Referring to FIG. 15, the FIC segment payload corresponds to the portion starting from the 'for' loop statement. Meanwhile, the FIC segment header may include a FIC_type field, an error_indicator field, a FIC_seg_number field, and an FIC_last_seg_number field. A detailed description of each field will now be given.

The FIC_type field is a 2-bit field indicating the type of the corresponding FIC.

The error_indicator field is a 1-bit field, which indicates whether or not an error has occurred within the FIC segment during data transmission. If an error has occurred, the value of the error_indicator field is set to '1'. More specifically, when an error that has failed to be recovered still remains during the configuration process of the FIC segment, the error_indicator field value is set to '1'. The error_indicator field enables the receiving system to recognize the presence of an error within the FIC data.

The FIC_seg_number field is a 4-bit field. Herein, when a single FIC body is divided into a plurality of FIC segments and transmitted, the FIC_seg_number field indicates the number of the corresponding FIC segment.

Finally, the FIC_last_seg_number field is also a 4-bit field. The FIC_last_seg_number field indicates the number of the last FIC segment within the corresponding FIC body.

FIG. 16 illustrates an exemplary bit stream syntax structure with respect to a payload of an FIC segment according to the present invention, when an FIC type field value is equal to '0'.

According to the embodiment of the present invention, the payload of the FIC segment is divided into 3 different regions. A first region of the FIC segment payload exists only when the FIC_seg_number field value is equal to '0'. Herein, the first region may include a current_next_indicator field, an ESG_version field, and a transport_stream_id field. However, depending upon the embodiment of the present invention, it may be assumed that each of the 3 fields exists regardless of the FIC_seg_number field.

The current_next_indicator field is a 1-bit field. The current_next_indicator field acts as an indicator identifying whether the corresponding FIC data carry MH ensemble configuration information of an MH frame including the current FIC segment, or whether the corresponding FIC data carry MH ensemble configuration information of a next MH frame.

The ESG_version field is a 5-bit field indicating ESG version information. Herein, by providing version information on the service guide providing channel of the corresponding ESG, the ESG_version field enables the receiving system to notify whether or not the corresponding ESG has been updated.

Finally, the transport_stream_id field is a 16-bit field acting as a unique identifier of a broadcast stream through which the corresponding FIC segment is being transmitted.

A second region of the FIC segment payload corresponds to an ensemble loop region, which includes an ensemble_id field, a SI_version field, and a num_channel field.

More specifically, the ensemble_id field is an 8-bit field indicating identifiers of an MH ensemble through which MH services are transmitted. The MH services will be described in more detail in a later process. Herein, the ensemble_id field binds the MH services and the MH ensemble.

The SI_version field is a 4-bit field indicating version information of SI data included in the corresponding ensemble, which is being transmitted within the RS frame.

Finally, the num_channel field is an 8-bit field indicating the number of virtual channel being transmitted via the corresponding ensemble.

A third region of the FIC segment payload a channel loop region, which includes a channel_type field, a channel_activity field, a CA_indicator field, a stand_alone_service_indicator field, a major_channel_num field, and a minor_channel_num field.

The channel_type field is a 5-bit field indicating a service type of the corresponding virtual channel. For example, the channel_type field may indicates an audio/video channel, an audio/video and data channel, an audio-only channel, a data-only channel, a file download channel, an ESG delivery channel, a notification channel, and so on.

The channel_activity field is a 2-bit field indicating activity information of the corresponding virtual channel. More specifically, the channel_activity field may indicate whether the current virtual channel is providing the current service.

The CA_indicator field is a 1-bit field indicating whether or not a conditional access (CA) is applied to the current virtual channel.

The stand_alone_service_indicator field is also a 1-bit field, which indicates whether the service of the corresponding virtual channel corresponds to a stand alone service.

The major_channel_num field is an 8-bit field indicating a major channel number of the corresponding virtual channel.

Finally, the minor_channel_num field is also an 8-bit field indicating a minor channel number of the corresponding virtual channel.

Service Table Map

FIG. 17 illustrates an exemplary bit stream syntax structure of a service map table (hereinafter referred to as "SMT") according to the present invention.

According to the embodiment of the present invention, the SMT is configured in an MPEG-2 private section format. However, this will not limit the scope and spirit of the present invention. The SMT according to the embodiment of the present invention includes description information for each virtual channel within a single MH ensemble. And, additional information may further be included in each descriptor area.

Herein, the SMT according to the embodiment of the present invention includes at least one field and is transmitted from the transmitting system to the receiving system.

As described in FIG. 3, the SMT section may be transmitted by being included in the MH TP within the RS frame. In this case, each of the RS frame decoders 170 and 180, shown in FIG. 1, decodes the inputted RS frame, respectively. Then, each of the decoded RS frames is outputted to the respective RS frame handler 211 and 212. Thereafter, each RS frame handler 211 and 212 identifies the inputted RS frame by row units, so as to create an MH TP, thereby outputting the created MH TP to the MH TP handler 213. When it is determined that the corresponding MH TP includes an SMT section based upon the header in each of the inputted MH TP, the MH TP handler 213 parses the corresponding SMT section, so as to output the SI data within the parsed SMT section to the physical adaptation control signal handler 216. However, this is limited to when the SMT is not encapsulated to IP datagrams.

Meanwhile, when the SMT is not encapsulated to IP datagrams, and when it is determined that the corresponding MH TP includes an SMT section based upon the header in each of the inputted MH TP, the MH TP handler 213 outputs the SMT section to the IP network stack 220. Accordingly, the IP network stack 220 performs IP and UDP processes on the inputted SMT section and, then, outputs the processed SMT section to the SI handler 240. The SI handler 240 parses the inputted SMT section and controls the system so that the parsed SI data can be stored in the storage unit 290.

The following corresponds to example of the fields that may be transmitted through the SMT.

The table_id field corresponds to an 8-bit unsigned integer number, which indicates the type of table section. The table_id field allows the corresponding table to be defined as the service map table (SMT).

The ensemble_id field is an 8-bit unsigned integer field, which corresponds to an ID value associated to the corresponding MH ensemble. Herein, the ensemble_id field may be assigned with a value ranging from range '0x00' to '0x3F'. It is preferable that the value of the ensemble_id field is derived from the parade_id of the TPC data, which is carried from the baseband processor of MH physical layer subsystem. When the corresponding MH ensemble is transmitted through (or carried over) the primary RS frame, a value of '0' may be used for the most significant bit (MSB), and the remaining 7 bits are used as the parade_id value of the associated MH parade (i.e., for the least significant 7 bits). Alternatively, when the corresponding MH ensemble is transmitted through (or carried over) the secondary RS frame, a value of '1' may be used for the most significant bit (MSB).

The num_channels field is an 8-bit field, which specifies the number of virtual channels in the corresponding SMT section.

Meanwhile, the SMT according to the embodiment of the present invention provides information on a plurality of virtual channels using the 'for' loop statement.

The major_channel_num field corresponds to an 8-bit field, which represents the major channel number associated with the corresponding virtual channel. Herein, the major_channel_num field may be assigned with a value ranging from '0x00' to '0xFF'.

The minor_channel_num field corresponds to an 8-bit field, which represents the minor channel number associated with the corresponding virtual channel. Herein, the minor_channel_num field may be assigned with a value ranging from '0x00' to '0xFF'.

The short_channel_name field indicates the short name of the virtual channel.

The service_id field is a 16-bit unsigned integer number (or value), which identifies the virtual channel service.

The service_type field is a 6-bit enumerated type field, which designates the type of service carried in the corresponding virtual channel as defined in Table 2 below.

TABLE 2

| | |
|---|---|
| 0x00 | [Reserved] |
| 0x01 | MH_digital_television field: the virtual channel carries television programming (audio, video and optional associated data) conforming to ATSC standards. |
| 0x02 | MH_audio field: the virtual channel carries audio programming (audio service and optional associated data) conforming to ATSC standards. |
| 0x03 | MH_data_only_service field: the virtual channel carries a data service conforming to ATSC standards, but no video or audio component. |
| 0x04 to 0xFF | [Reserved for future ATSC usage] |

The virtual_channel_activity field is a 2-bit enumerated field identifying the activity status of the corresponding virtual channel. When the most significant bit (MSB) of the virtual_channel_activity field is '1', the virtual channel is active, and when the most significant bit (MSB) of the virtual_channel_activity field is '0', the virtual channel is inactive. Also, when the least significant bit (LSB) of the virtual_channel_activity field is '1', the virtual channel is hidden (when set to 1), and when the least significant bit (LSB) of the virtual_channel_activity field is '0', the virtual channel is not hidden.

The num_components field is a 5-bit field, which specifies the number of IP stream components in the corresponding virtual channel.

The IP_version_flag field corresponds to a 1-bit indicator. More specifically, when the value of the IP_version_flag field is set to '1', this indicates that a source_IP_address field, a virtual_channel_target_IP_address field, and a component_target_IP_address field are IPv6 addresses. Alternatively, when the value of the IP_version_flag field is set to '0', this indicates that the source_IP_address field, the virtual_channel_target_IP_address field, and the component_target_IP_address field are IPv4.

The source_IP_address_flag field is a 1-bit Boolean flag, which indicates, when set, that a source IP address of the corresponding virtual channel exist for a specific multicast source.

The virtual_channel_target_IP_address_flag field is a 1-bit Boolean flag, which indicates, when set, that the corresponding IP stream component is delivered through IP datagrams with target IP addresses different from the virtual_channel_target_IP_address. Therefore, when the flag is set, the receiving system (or receiver) uses the component_target_IP_address as the target_IP_address in order to access the corresponding IP stream component. Accordingly, the receiving system (or receiver) may ignore the virtual_channel_target_IP_address field included in the num_channels loop.

The source_IP_address field corresponds to a 32-bit or 128-bit field. Herein, the source_IP_address field will be significant (or present), when the value of the source_IP_address_flag field is set to '1'. However, when the value of the source_IP_address_flag field is set to '0', the source_IP_address field will become insignificant (or absent). More specifically, when the source_IP_address_flag field value is set to '1', and when the IP_version_flag field value is set to '0', the source_IP_address field indicates a 32-bit IPv4 address, which shows the source of the corresponding virtual channel. Alternatively, when the IP_version_flag field value is set to '1', the source_IP_address field indicates a 128-bit IPv6 address, which shows the source of the corresponding virtual channel.

The virtual_channel_target_IP_address field also corresponds to a 32-bit or 128-bit field. Herein, the virtual_channel_target_IP_address field will be significant (or present), when the value of the virtual_channel_target_IP_address_flag field is set to '1'. However, when the value of the virtual_channel_target_IP_address_flag field is set to '0', the virtual_channel_target_IP_address field will become insignificant (or absent). More specifically, when the virtual_channel_target_IP_address_flag field value is set to '1', and when the IP_version_flag field value is set to '0', the virtual_channel_target_IP_address field indicates a 32-bit target IPv4 address associated to the corresponding virtual channel. Alternatively, when the virtual_channel_target_IP_address_flag field value is set to '1', and when the IP_version_flag field value is set to '1', the virtual_channel_target_IP_address field indicates a 64-bit target IPv6 address associated to the corresponding virtual channel. If the virtual_channel_target_IP_address field is insignificant (or absent), the component_target_IP_address field within the num_channels loop should become significant (or present).

And, in order to enable the receiving system to access the IP stream component, the component_target_IP_address field should be used.

Meanwhile, the SMT according to the embodiment of the present invention uses a 'for' loop statement in order to provide information on a plurality of components.

Herein, the RTP_payload_type field, which is assigned with 7 bits, identifies the encoding format of the component based upon Table 3 shown below. When the IP stream component is not encapsulated to RTP, the RTP_payload_type field shall be ignored (or deprecated).

Table 3 below shows an example of an RTP payload type.

TABLE 3

| RTP_payload_type | Meaning |
|---|---|
| 35 | AVC video |
| 36 | MH audio |
| 37 to 72 | [Reserved for future ATSC use] |

The component_target_IP_address_flag field is a 1-bit Boolean flag, which indicates, when set, that the corresponding IP stream component is delivered through IP datagrams with target IP addresses different from the virtual_channel_target_IP_address. Furthermore, when the component_target_IP_address_flag is set, the receiving system (or receiver) uses the component_target_IP_address field as the target IP address for accessing the corresponding IP stream component. Accordingly, the receiving system (or receiver) will ignore the virtual_channel_target_IP_address field included in the num_channels loop.

The component_target_IP_address field corresponds to a 32-bit or 128-bit field. Herein, when the value of the IP_version_flag field is set to '0', the component_target_IP_address field indicates a 32-bit target IPv4 address associated to the corresponding IP stream component. And, when the value of the IP_version_flag field is set to '1', the component_target_IP_address field indicates a 128-bit target IPv6 address associated to the corresponding IP stream component.

The port_num_count field is a 6-bit field, which indicates the number of UDP ports associated with the corresponding IP stream component. A target UDP port number value starts from the target_UDP_port_num field value and increases (or is incremented) by 1. For the RTP stream, the target UDP port number should start from the target_UDP_port_num field value and shall increase (or be incremented) by 2. This is to incorporate RTCP streams associated with the RTP streams.

The target_UDP_port_num field is a 16-bit unsigned integer field, which represents the target UDP port number for the corresponding IP stream component. When used for RTP streams, the value of the target_UDP_port_num field shall correspond to an even number. And, the next higher value shall represent the target UDP port number of the associated RTCP stream.

The component_level_descriptor( ) represents zero or more descriptors providing additional information on the corresponding IP stream component.

The virtual_channel_level_descriptor( ) represents zero or more descriptors providing additional information for the corresponding virtual channel.

The ensemble_level_descriptor( ) represents zero or more descriptors providing additional information for the MH ensemble, which is described by the corresponding SMT.

FIG. 18 illustrates an exemplary bit stream syntax structure of an MH audio descriptor according to the present invention. When at least one audio service is present as a component of the current event, the MH_audio_descriptor( ) shall be used as a component_level_descriptor of the SMT. The MH_audio_descriptor( ) may be capable of informing the system of the audio language type and stereo mode status. If there is no audio service associated with the current event, then it is preferable that the MH_audio_descriptor( ) is considered to be insignificant (or absent) for the current event. Each field shown in the bit stream syntax of FIG. 18 will now be described in detail.

The descriptor_tag field is an 8-bit unsigned integer having a TBD value, which indicates that the corresponding descriptor is the MH_audio_descriptor( ) The descriptor_length field is also an 8-bit unsigned integer, which indicates the length (in bytes) of the portion immediately following the descriptor_length field up to the end of the MH_audio_descriptor( ) The channel_configuration field corresponds to an 8-bit field indicating the number and configuration of audio channels. The values ranging from '1' to '6' respectively indicate the number and configuration of audio channels as given for "Default bit stream index number" in Table 42 of ISO/IEC 13818-7:2006. All other values indicate that the number and configuration of audio channels are undefined.

The sample_rate_code field is a 3-bit field, which indicates the sample rate of the encoded audio data. Herein, the indication may correspond to one specific sample rate, or may correspond to a set of values that include the sample rate of the encoded audio data as defined in Table A3.3 of ATSC A/52B. The bit_rate_code field corresponds to a 6-bit field. Herein, among the 6 bits, the lower 5 bits indicate a nominal bit rate. More specifically, when the most significant bit (MSB) is '0', the corresponding bit rate is exact. On the other hand, when the most significant bit (MSB) is '0', the bit rate corresponds to an upper limit as defined in Table A3.4 of ATSC A/53B. The ISO_639 language_code field is a 24-bit (i.e., 3-byte) field indicating the language used for the audio stream component, in conformance with ISO 639.2/B [x]. When a specific language is not present in the corresponding audio stream component, the value of each byte will be set to '0x00'.

FIG. 19 illustrates an exemplary bit stream syntax structure of an MH RTP payload type descriptor according to the present invention.

The MH_RTP_payload_type_descriptor( ) specifies the RTP payload type. Yet, the MH_RTP_payload_type_descriptor( ) exists only when the dynamic value of the RTP_payload_type field within the num_components loop of the SMT is in the range of '96' to '127'. The MH_RTP_payload_type_descriptor( ) is used as a component_level_descriptor of the SMT.

The MH_RTP_payload_type_descriptor translates (or matches) a dynamic RTP_payload_type field value into (or with) a MIME type. Accordingly, the receiving system (or receiver) may collect (or gather) the encoding format of the IP stream component, which is encapsulated in RTP.

The fields included in the MH_RTP_payload_type_descriptor( ) will now be described in detail.

The descriptor_tag field corresponds to an 8-bit unsigned integer having the value TBD, which identifies the current descriptor as the MH_RTP_payload_type_descriptor( )

The descriptor_length field also corresponds to an 8-bit unsigned integer, which indicates the length (in bytes) of the portion immediately following the descriptor_length field up to the end of the MH_RTP_payload_type_descriptor( )

The RTP_payload_type field corresponds to a 7-bit field, which identifies the encoding format of the IP stream component. Herein, the dynamic value of the RTP_payload_type field is in the range of '96' to '127'.

The MIME_type_length field specifies the length (in bytes) of the MIME_type field.

The MIME_type field indicates the MIME type corresponding to the encoding format of the IP stream component, which is described by the MH_RTP_payload_type_descriptor( )

FIG. 20 illustrates an exemplary bit stream syntax structure of an MH current event descriptor according to the present invention.

The MH_current_event_descriptor( ) shall be used as the virtual_channel_level_descriptor( ) within the SMT. Herein, the MH_current_event_descriptor( ) provides basic information on the current event (e.g., the start time, duration, and title of the current event, etc.), which is transmitted via the respective virtual channel.

The fields included in the MH_current_event_descriptor( ) will now be described in detail.

The descriptor_tag field corresponds to an 8-bit unsigned integer having the value TBD, which identifies the current descriptor as the MH_current_event_descriptor( )

The descriptor_length field also corresponds to an 8-bit unsigned integer, which indicates the length (in bytes) of the portion immediately following the descriptor_length field up to the end of the MH_current_event_descriptor( )

The current_event_start_time field corresponds to a 32-bit unsigned integer quantity. The current_event_start_time field represents the start time of the current event and, more specifically, as the number of GPS seconds since 00:00:00 UTC, Jan. 6, 1980.

The current_event_duration field corresponds to a 24-bit field. Herein, the current_event_duration field indicates the duration of the current event in hours, minutes, and seconds (wherein the format is in 6 digits, 4-bit BCD=24 bits).

The title_length field specifies the length (in bytes) of the title_text field. Herein, the value '0' indicates that there are no titles existing for the corresponding event.

The title_text field indicates the title of the corresponding event in event title in the format of a multiple string structure as defined in ATSC A/65C [x].

FIG. 21 illustrates an exemplary bit stream syntax structure of an MH next event descriptor according to the present invention.

The optional MH_next_event_descriptor( ) shall be used as the virtual_channel_level_descriptor( ) within the SMT. Herein, the MH_next_event_descriptor( ) provides basic information on the next event (e.g., the start time, duration, and title of the next event, etc.), which is transmitted via the respective virtual channel. The fields included in the MH_next_event_descriptor( ) will now be described in detail.

The descriptor_tag field corresponds to an 8-bit unsigned integer having the value TBD, which identifies the current descriptor as the MH_next_event_descriptor( )

The descriptor_length field also corresponds to an 8-bit unsigned integer, which indicates the length (in bytes) of the portion immediately following the descriptor_length field up to the end of the MH_next_event_descriptor( )

The next_event_start_time field corresponds to a 32-bit unsigned integer quantity. The next_event_start_time field represents the start time of the next event and, more specifically, as the number of GPS seconds since 00:00:00 UTC, Jan. 6, 1980.

The next_event_duration field corresponds to a 24-bit field. Herein, the next_event_duration field indicates the duration of the next event in hours, minutes, and seconds (wherein the format is in 6 digits, 4-bit BCD=24 bits).

The title_length field specifies the length (in bytes) of the title_text field. Herein, the value '0' indicates that there are no titles existing for the corresponding event.

The title_text field indicates the title of the corresponding event in event title in the format of a multiple string structure as defined in ATSC A/65C [x].

FIG. 22 illustrates an exemplary bit stream syntax structure of an MH system time descriptor according to the present invention.

The MH_system_time_descriptor( ) shall be used as the ensemble_level_descriptor( ) within the SMT. Herein, the MH_system_time_descriptor( ) provides information on current time and date.

The MH_system_time_descriptor( ) also provides information on the time zone in which the transmitting system (or transmitter) transmitting the corresponding broadcast stream is located, while taking into consideration the mobile/portable characteristics of the MH service data. The fields included in the MH_system_time_descriptor( ) will now be described in detail.

The descriptor_tag field corresponds to an 8-bit unsigned integer having the value TBD, which identifies the current descriptor as the MH_system_time_descriptor( )

The descriptor_length field also corresponds to an 8-bit unsigned integer, which indicates the length (in bytes) of the portion immediately following the descriptor_length field up to the end of the MH_system_time_descriptor( )

The system_time field corresponds to a 32-bit unsigned integer quantity.

The system_time field represents the current system time and, more specifically, as the number of GPS seconds since 00:00:00 UTC, Jan. 6, 1980.

The GPS_UTC_offset field corresponds to an 8-bit unsigned integer, which defines the current offset in whole seconds between GPS and UTC time standards. In order to convert GPS time to UTC time, the GPS_UTC_offset is subtracted from GPS time. Whenever the International Bureau of Weights and Measures decides that the current offset is too far in error, an additional leap second may be added (or subtracted). Accordingly, the GPS_UTC_offset field value will reflect the change.

The time_zone_offset_polarity field is a 1-bit field, which indicates whether the time of the time zone, in which the broadcast station is located, exceeds (or leads or is faster) or falls behind (or lags or is slower) than the UTC time. When the value of the time_zone_offset_polarity field is equal to '0', this indicates that the time on the current time zone exceeds the UTC time. Therefore, the time_zone_offset_polarity field value is added to the UTC time value. Conversely, when the value of the time_zone_offset_polarity field is equal to '1', this indicates that the time on the current time zone falls behind the UTC time. Therefore, the time_zone_offset_polarity field value is subtracted from the UTC time value.

The time_zone_offset field is a 31-bit unsigned integer quantity. More specifically, the time_zone_offset field represents, in GPS seconds, the time offset of the time zone in which the broadcast station is located, when compared to the UTC time.

The daylight_savings field corresponds to a 16-bit field providing information on the Summer Time (i.e., the Daylight Savings Time). The time_zone field corresponds to a (5×8)-bit field indicating the time zone, in which the transmitting system (or transmitter) transmitting the corresponding broadcast stream is located.

Figure 23:
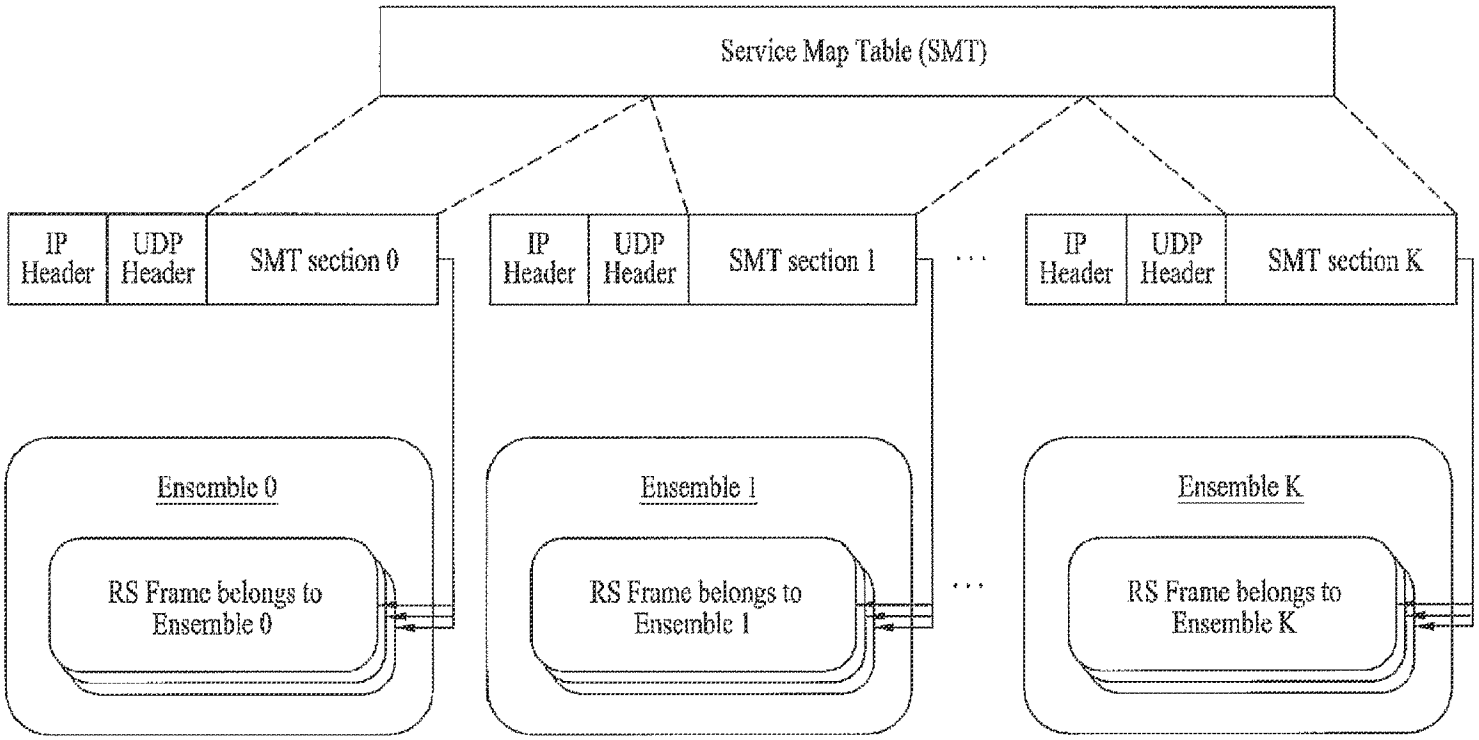
FIG. 23 illustrates segmentation and encapsulation processes of a service map table according to the present invention.

FIG. 23 illustrates segmentation and encapsulation processes of a service map table (SMT) according to the present invention.

According to the present invention, the SMT is encapsulated to UDP, while including a target IP address and a target UDP port number within the IP datagram.

More specifically, the SMT is first segmented into a predetermined number of sections, then encapsulated to a UDP header, and finally encapsulated to an IP header. In addition, the SMT section provides signaling information on all virtual channel included in the MH ensemble including the corresponding SMT section. At least one SMT section describing the MH ensemble is included in each RS frame included in the corresponding MH ensemble. Finally, each SMT section is identified by an ensemble_id included in each section. According to the embodiment of the present invention, by informing the receiving system of the target IP address and target UDP port number, the corresponding data (i.e., target IP address and target UDP port number) may be parsed without having the receiving system to request for other additional information.

Figure 24:
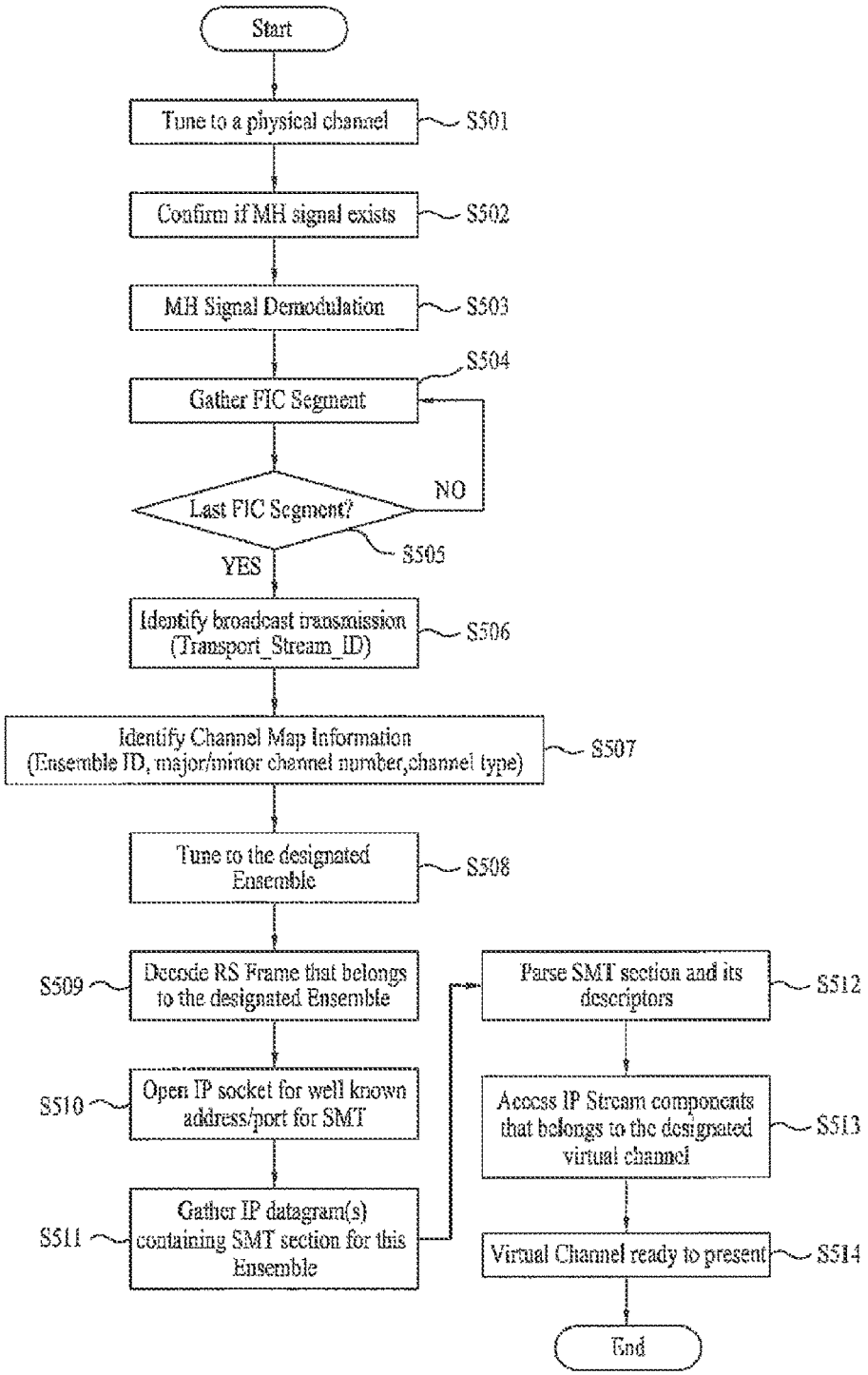
FIG. 24 illustrates a flow chart for accessing a virtual channel using FIC and SMT according to the present invention.

FIG. 24 illustrates a flow chart for accessing a virtual channel using FIC and SMT according to the present invention.

More specifically, a physical channel is tuned (S501). And, when it is determined that an MH signal exists in the tuned physical channel (S502), the corresponding MH signal is demodulated (S503). Additionally, FIC segments are grouped from the demodulated MH signal in sub-frame units (S504 and S505).

According to the embodiment of the present invention, an FIC segment is inserted in a data group, so as to be transmitted. More specifically, the FIC segment corresponding to each data group described service information on the MH ensemble to which the corresponding data group belongs. When the FIC segments are grouped in sub-frame units and, then, deinterleaved, all service information on the physical channel through which the corresponding FIC segment is transmitted may be acquired. Therefore, after the tuning process, the receiving system may acquire channel information on the corresponding physical channel during a sub-frame period. Once the FIC segments are grouped, in S504 and S505, a broadcast stream through which the corresponding FIC segment is being transmitted is identified (S506). For example, the broadcast stream may be identified by parsing the transport_stream_id field of the FIC body, which is configured by grouping the FIC segments.

Furthermore, an ensemble identifier, a major channel number, a minor channel number, channel type information, and so on, are extracted from the FIC body (S507). And, by using the extracted ensemble information, only the slots corresponding to the designated ensemble are acquired by using the time-slicing method, so as to configure an ensemble (S508).

Subsequently, the RS frame corresponding to the designated ensemble is decoded (S509), and an IP socket is opened for SMT reception (S510).

According to the example given in the embodiment of the present invention, the SMT is encapsulated to UDP, while including a target IP address and a target UDP port number within the IP datagram. More specifically, the SMT is first segmented into a predetermined number of sections, then encapsulated to a UDP header, and finally encapsulated to an IP header. According to the embodiment of the present invention, by informing the receiving system of the target IP address and target UDP port number, the receiving system parses the SMT sections and the descriptors of each SMT section without requesting for other additional information (S511).

The SMT section provides signaling information on all virtual channel included in the MH ensemble including the corresponding SMT section. At least one SMT section describing the MH ensemble is included in each RS frame included in the corresponding MH ensemble. Also, each SMT section is identified by an ensemble_id included in each section.

Furthermore each SMT provides IP access information on each virtual channel subordinate to the corresponding MH ensemble including each SMT. Finally, the SMT provides IP stream component level information required for the servicing of the corresponding virtual channel.

Therefore, by using the information parsed from the SMT, the IP stream component belonging to the virtual channel requested for reception may be accessed (S513). Accordingly, the service associated with the corresponding virtual channel is provided to the user (S514).

A receiver can acquire service configuration- and location-information from a specific data position of a transmission signal, such that it can quickly and effectively acquire desired services using the acquired information. As one example of this acquired information, the FIC data have been disclosed in the above embodiment. Other embodiments of the FIC data will hereinafter be described in detail.

Figure 25:
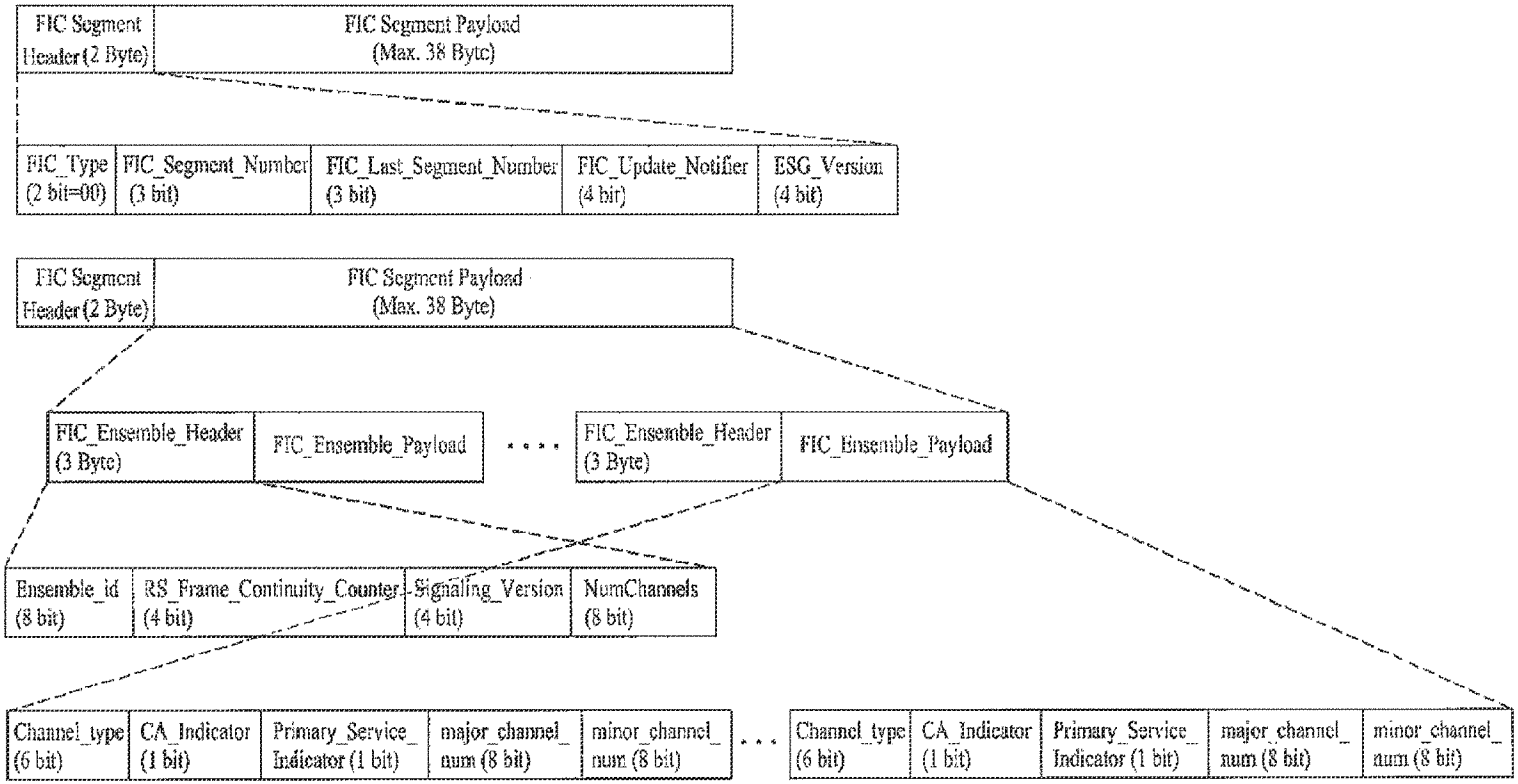
FIG. 25 is a second-type FIC segment according to the present invention.

FIG. 25 is a second-type FIC segment according to the present invention. In a header of the second-type FIC segment, a FIC_type field indicates a type of the FIC segment. The size of each information shown in FIG. 25 is represented by the number of bits or the number of bytes in parentheses, and may be variable as necessary. As shown in FIG. 14, an FIC body may be divided into a plurality of FIC segments.

A FIC_Segment_Number field of 3 bits indicates a serial number of FIC segments.

A FIC_Last_Segment_Number field of 3 bits indicates a number of the last FIC segment among FIC segments.

A FIC_Update_Notifier field of 4 bits indicates an update timing of FIC data. For example, if the FIC_update_Notifier field is set to '0000', this means that FIC is not immediately updated but is updated after the lapse of an MH signal frame including the FIC data having the same value as that of a corresponding field.

An ESG_version field of 4 bits indicates a version of service guide information which is exclusively transmitted through an ensemble.

Information contained in the second-type FIC segment includes at least one of a FIC_Ensemble_Header field and a FIC_Ensemble_Payload field.

The FIC_Ensemble_Header field includes an Ensemble_id field, an RS_Frame_Continuity_Counter field, a Signaling_version field, and a NumChannels field.

The Ensemble_id field of 8 bits indicates an ensemble indicator (ID). The RS_Frame_Continuity_Counter field of 4 bits indicates whether the RS frame transmitting the ensemble is continued or discontinued. The Signaling_version field of 4 bits indicates a version of signaling information of the ensemble applied to the RS frame. For example, the service transmitted through an ensemble may be described by the service map table (SMT), such that version information of this SMT may be established in this field. In addition, provided that the ensemble can be described by other signaling information transmitted on the basis of a section, version information of this signaling information may also be established in the field. For the convenience of description and better understanding of the present invention, if specific information, which is transmitted in the form of a section used as a specific transmission unit of the ensemble, describes mobile service data contained in the ensemble, this specific information is referred to as service table information.

A NumChannels field of 8 bits indicates the number of virtual channels contained in each ensemble.

A FIC_Ensemble_Payload field may include a Channel_type field, a CA_indicator field, a Primary_Service_Indicator field, a major_channel_num field, and a minor_channel_num field.

The Channel_type of 6 bits indicates a type of a service transferred through a corresponding virtual channel. Examples of this field value will hereinafter be described in detail.

The CA_indicator field of one bit represents conditional access information indicating whether a corresponding virtual channel is an access-restricted channel. For example, if the CA_indicator field is set to 1, an access to a corresponding virtual channel may be restricted.

The Primary_Service_Indicator field of one bit indicates whether a corresponding virtual channel is a primary service.

The major_channel_num field of 8 bits indicates a major number of a corresponding virtual channel, and a minor_channel_num field of 8 bits indicates a minor number of the corresponding virtual channel.

In the FIC_ensemble_payload, various fields from the Channel_type field to the minor_channel_num field from among the above-mentioned fields may be repeated according to the number of channels.

FIG. 26 is a table illustrating syntax of the second-type FIC segment shown in FIG. 25 according to the present invention. Individual fields have been shown in FIG. 25. The FIC segment is able to acquire information (hereinafter referred to as binding information) indicating the relationship between the ensemble and the virtual channel. Namely, if acquisition of FIC data is completed, this FIC data indicates which one of virtual channels is transmitted through which ensemble.

Figure 27:
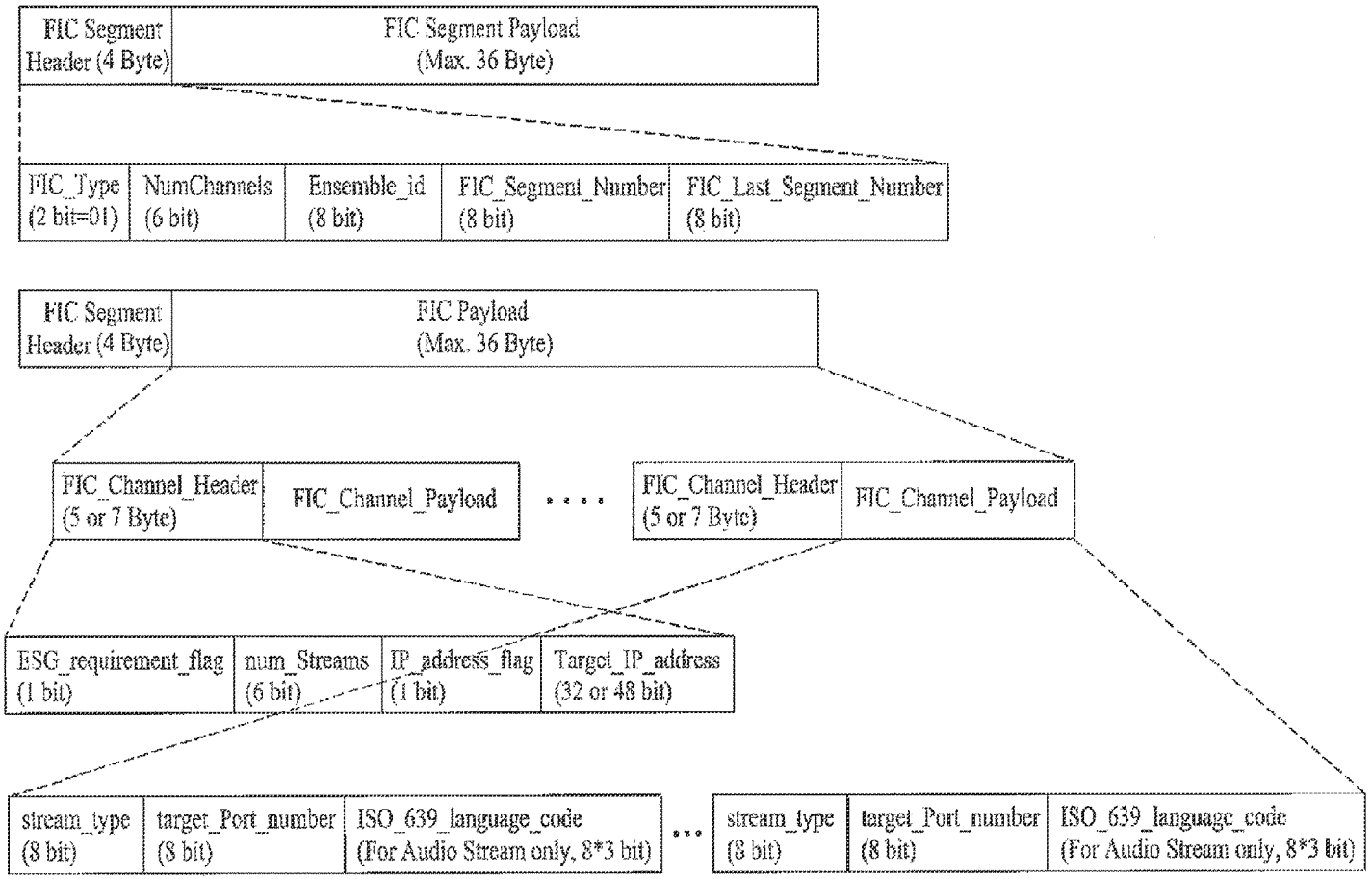
FIG. 27 is a third-type FIC segment according to the present invention.

FIG. 27 is a third-type FIC segment according to the present invention. In FIG. 27, size of each information is represented by the number of bits in parentheses, and this information size may be variable as necessary. In an embodiment of the third-type FIC segment, the FIC segment header field (FIC_Segment_Header) includes a FIC_type field, a NumChannels field, an Ensemble_id field, an FIC_Section_Number field, and an FIC_Last_Section_Number field.

The FIC_type field of 2 bits indicates a type of the FIC segment.

The NumChannels field of 6 bits indicates the number of virtual channels transferred through an ensemble transmitting a corresponding FIC.

The FIC_Section_Number field of 8 bits indicates a number of a corresponding segment when FIC body data is divided into a plurality of segments.

The FIC_Last_Section_Number field indicates the number of the last FIC segment contained in corresponding FIC body data.

The FIC segment payload (FIC_Segment_Payload) may include a FIC_channel_header field and a FIC_channel_payload field. The FIC_channel_header field includes an ESG_requirement_flag field, a num_streams field, an IP_address_flag field, and a Target_IP_address field.

The ESG_requirement_flag field of one bit indicates whether service guide information is needed for a user to view a corresponding virtual channel. For example, if this ESG_requirement_flag field is set to 1, this field indicates whether service guide information is needed for the user to view a virtual channel. Namely, the ESG_requirement_flag field indicates that the virtual channel can be selected through service guide information.

The num_streams field of 6 bits indicates the number of video data, audio data, and data streams transferred through a corresponding virtual channel.

The IP_address_flag field of one bit can represent an IP address for providing a corresponding virtual channel by an IP version 4 (IPv4) or IP version 6 (IPv6). An address of the IP version 4 (IPv4) may be composed of 32 bits, and an address of IP version 6 (IPv6) may be composed of 48 bits. The Target_IP_address field indicates an IP address capable of receiving a corresponding virtual channel.

The FIC_channel_payload field may include a stream_type field, a target_port_number field, and an ISO_639_language_code field.

The stream_type of 8 bits indicates a type of a stream transferred through a corresponding virtual channel. The Target_port_number field of 8 bits indicates the number of a transport port capable of acquiring a corresponding stream. If a stream is an audio stream, the ISO_639_language_code field denoted by 8*3 bits indicates a language of this audio.

FIG. 28 is a table illustrating a structure of the third-type FIC segment shown in FIG. 27 according to the present invention. Individual fields have been shown in FIG. 27. This FIC segment can acquire not only binding information associated with an ensemble and a virtual channel, but also acquisition position information of each virtual channel. Namely, if FIC data is acquired, position information of a service provided to the ensemble can be recognized.

FIG. 29 is a channel type contained in FIC data according to the present invention. The channel_type field indicates a service type of a service associated with a virtual channel. For example, if the channel_type field is set to 0x01, this value of 0x01 represents that a virtual channel service indicates real time audio/video (A/V) broadcasting. If the channel_type field is set to 0x02, this value of 0x02 indicates real time audio dedicated broadcasting. If the channel_type field is set to 0x03, this value of 0x03 indicates real time audio/video (A/V) broadcasting. If the channel_type field is set to 0x04, this value of 0x04 indicates real time audio dedicated broadcasting. If the channel_type field is set to 0x05, this value of 0x05 indicates non-real time audio/video (A/V) broadcasting. If the channel_type field is set to 0x06, this value of 0x06 indicates non-real time audio dedicated broadcasting. If the channel_type field is set to 0x07, this value of 0x07 indicates that a virtual channel service is either a non-real time data broadcasting or a file transfer service. In addition, other services may also be shown in the channel_type field.

Figure 30:
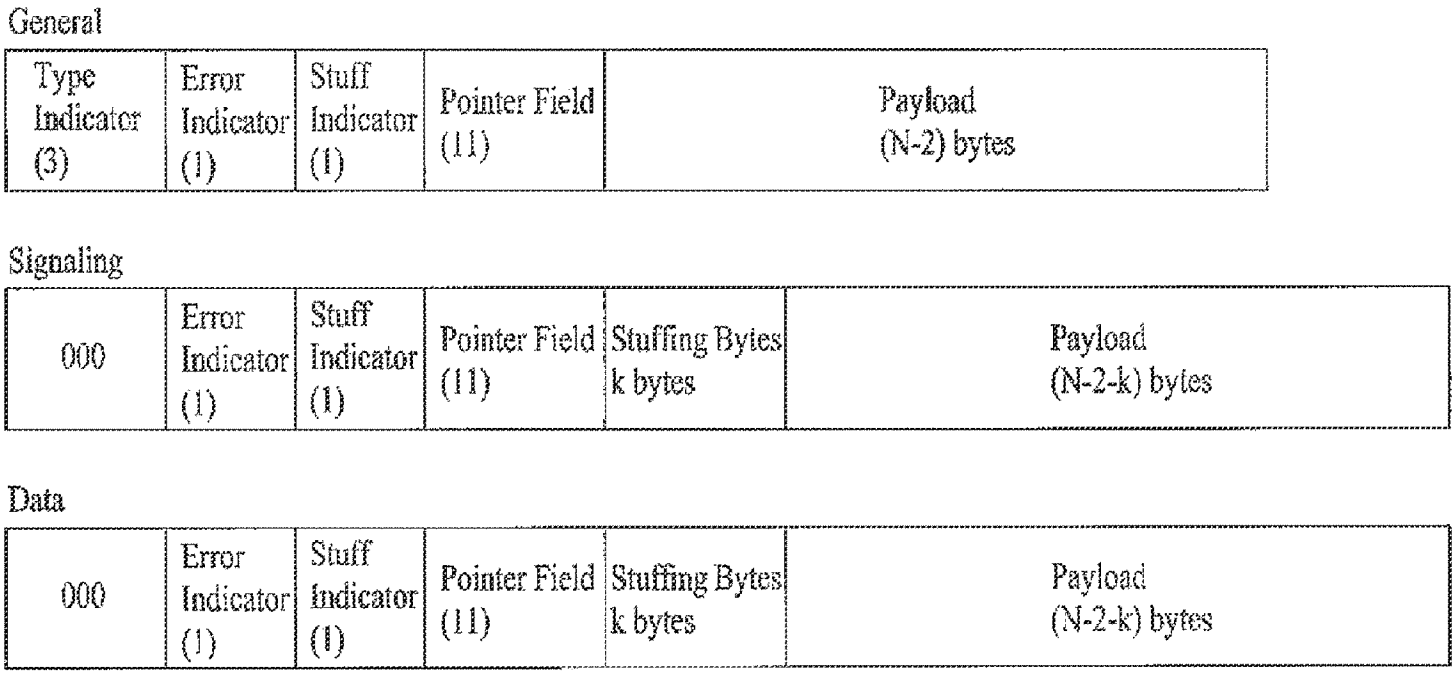
FIG. 30 is an MH transport packet (TP) shown in FIG. 3 according to the present invention.

FIG. 30 is an MH transport packet (TP) shown in FIG. 3 according to the present invention. The RS frame of FIG. 3 includes a plurality of MH transport packets.

A general type of the MH transport packet (TP) includes a type indicator field of 3 bits, an error indicator field of one bit, a stuffing-byte field of one bit, a pointer field of 11 bits, and a payload field.

This payload field may include various format data, for example, general mobile service data, service table information transmitted in the form of a section used as a specific transmission unit, or IP datagram, etc.

The type indicator field of 3 bits indicates a type of the MH transport packet (TP). This MH TP type may be changed according to categories of data entering the payload field.

The error indicator field of one bit indicates the presence or absence of any error in the MH TP. The stuffing-byte field of one bit indicates the presence or absence of a stuffing byte in the payload.

The example shown in FIG. 30 shows a service table information type (i.e., signaling) contained in the payload, and a type of mobile service data.

FIG. 31 shows another example of service table information transferred to the MH transport packet (TP). FIG. 17 has illustrated an SMT used as service table information. FIG. 31 may be another example of the SMT, which is transferred to the MH TP and describes an ensemble service.

A table_id field of 8 bits indicates an indicator of a table.

A section_number field of 8 bits indicates the number of a section used as an SMT transmission unit.

A last_section_number field of 8 bits indicates the last section number acquired when the SMT is transmitted after being divided into sections.

The following fields may be contained in each virtual channel (num_channels_in_ensemble) of a corresponding ensemble.

An ESG_requirement_flag field of one bit indicates whether service guide information is needed to acquire a virtual channel service.

A num_streams field of 6 bits indicates the number of audio/video/data streams of a corresponding virtual channel.

An IP_version_flag field of one bit indicates whether an IP address of a virtual channel is an IPv4 or an IPv6. In association with the case of IPv4 or IPv6, an IP address (target_IP_address) transferring a virtual channel is transmitted according to a corresponding IP address format.

In association with each stream (num_streams) contained in the virtual channel, the stream_type field of 8 bits indicates the type of a corresponding stream. The stream_type field will hereinafter be described in detail.

A target_port_number field of 8 bits indicates a number of a port corresponding to each stream.

An ISO_639 language_code field composed of 8*3 bits indicates audio language information when a corresponding stream is an audio stream.

FIG. 32 is a stream type of a virtual channel according to the present invention.

As can be seen from FIG. 32, it is determined whether a stream_type field constructing a mobile service of a virtual channel is an MH video stream (0x01), an MH audio stream (0x02), an MH data broadcasting (0x03), or an MH file transfer stream (0x04).

Relationship Between FIC Data and Other Data

As shown in the above-mentioned description, mobile service data and main service data are multiplexed in the MH broadcasting signal and the multiplexed data in the MH broadcasting signal is transmitted. In order to transmit mobile service data, transmission-parameter-channel signaling information is established in TPC data, and fast-information—channel signaling information is established in FIC data. TPC data and FIC data are multiplexed and randomized, ¼ Parallel Concatenated Convolutional Code (PCCC) is error-correction-encoded, such that the PCCC-encoded data is transmitted to a data group. Otherwise, mobile service data contained in the ensemble is SCCC (Serial Concatenated Convolutional Code)-outer-encoded, such that the SCCC-encoded data is transmitted to a data group. Mobile service data includes content data constructing a service and service table information describing this service. This service table information includes channel information of the ensemble indicating at least one virtual channel group, and includes service description information based on channel information.

For the convenience of description, if several data segments pass through different modulation processes in a transmission unit or different demodulation processes in a reception unit although the data segments located in the same signal frame (or the same data group), it is represented that the data segments are transferred to different data channels because these data segments are signaling-processed via different paths. For example, it can be represented that the TPC data and FIC data are transmitted to a data channel other than a data channel in which the content data and the service table information are transmitted. Because error correction coding/decoding processes to which the TPC data and FIC are applied are different from those applied to the content data and the service table information contained in the ensemble.

Under the above-mentioned assumption, a method for receiving the MH broadcasting signal will hereinafter be described. A digital broadcasting system according to the present invention receives a broadcasting signal in which mobile service data and main service data are multiplexed. The system acquires version information of FIC data from TPC data received in a first data channel among mobile service data and acquires binding information of an ensemble and a virtual channel contained in the ensemble from the FIC data. Therefore, it can be recognized which one of ensembles transmits a service of a user-selected virtual channel.

Thus, the system can receive the ensemble transferring the corresponding virtual channel according to a parade format. The system can acquire data groups contained in a series of slots from the parade received in a receiver. If the data groups are collected during only one MH frame, the system can acquire the RS frame equipped with this ensemble. Therefore, the system decodes the RS frame, and parses the service table information contained in the decoded RS frame. The system can acquire a service of the virtual channel from the parsed service table information using information describing the user-selected virtual channel.

The FIC data transferred to a first data channel may indicate binding information an ensemble and the virtual channel associated with the ensemble, in which the ensemble is transferred to a second data channel. Using the binding information, the system can parse the service table information contained in a specific ensemble, such that the service can be quickly displayed.

Figure 33:
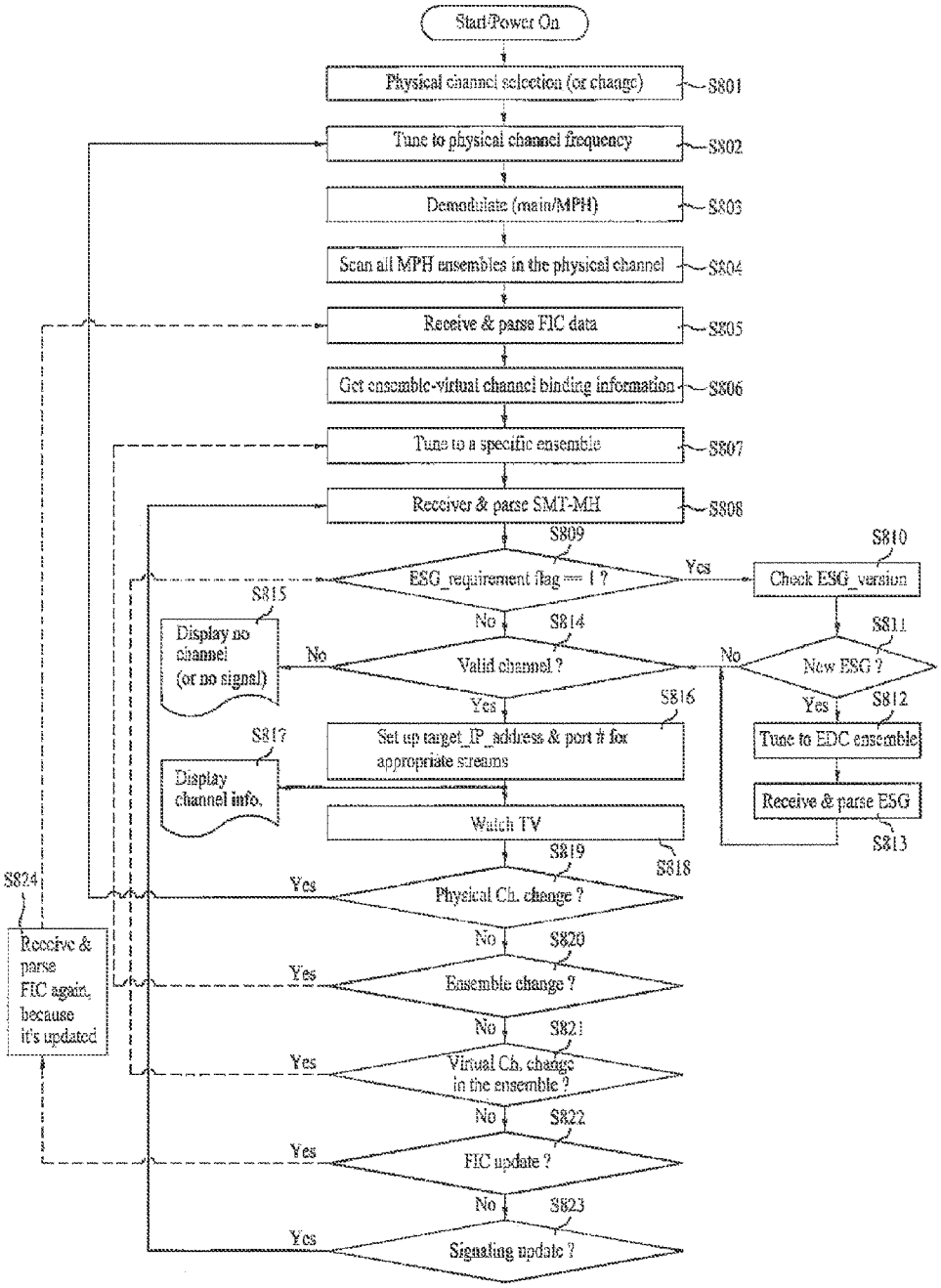
FIG. 33 is a flow chart illustrating a data processing method according to the present invention.

FIG. 33 is a flow chart illustrating the above data processing method according to the present invention.

Referring to FIG. 33, one physical channel is selected and changed at step S801, and a selected physical channel is tuned at step S802. The digital broadcasting system demodulates a broadcasting signal in which main service data and mobile service data are multiplexed at step S803. The system scans the ensemble contained in a physical channel at step S804. The system acquires FIC data and parses it at step S805.

The system acquires binding information of a virtual channel and ensembles at step S806, and searches for an ensemble including a desired virtual channel at step S807. As a result, the system searches for service table information (SMT) in the searched ensemble, and parses the searched SMT at step S808.

If there is needed the service guide information for acquiring a service from a corresponding virtual channel at step S809, the system checks ESG version information from FIC data at step S810.

If the checked ESG version information is new version information at step S811, the system selects the ensemble providing service guide information at step S812, acquires the service guide information, and parses the acquired service guide information at step S813.

The system determines whether the selected virtual channel is a valid channel at step S814 after performing the step S813 or S811. If the selected virtual channel is not determined to be the valid channel, the system displays a specific status in which a broadcasting signal cannot be displayed at step S815.

If the selected virtual channel is determined to be the valid channel at step S814, the system establishes either an IP address for acquiring the stream of a corresponding virtual channel or the number of ports at step S816. The system can display a channel number on the screen according to receiver operations at step S817.

If a corresponding service is displayed at step S818 and a physical channel is changed to another at step S819, the system returns to the step S802. If the ensemble is changed to another at step S820, the system performs the step S807.

If the virtual channel of the ensemble is changed to another at step S821, the system performs the step S809. If a version of FIC data is changed to another, the system acquires specific information contained in FIC body data from the signal frame, and then performs the step S805. If section-formatted signaling information having the same section format as that of service table information is updated at step S823, the system performs the step S808.

Therefore, by means of the FIC data, the system can quickly identify the ensemble transferring a selected service, and can acquire a desired service from the identified ensemble without acquiring the desired service from all ensembles.

As apparent from the above description, the digital broadcasting system and the data processing method according to the present invention have strong resistance to any errors encountered when mobile service data is transmitted over a channel, and can be easily compatible with the conventional receiver. The digital broadcasting system according to the present invention can normally receive mobile service data without any errors over a poor channel which has lots of ghosts and noises. The digital broadcasting system according to the present invention inserts known data at a specific location of a data zone, and performs signal transmission, thereby increasing the reception (Rx) performance under a high-variation channel environment. Specifically, the digital broadcasting system according to the present invention can be more effectively used for mobile phones or mobile receivers, channel conditions of which are excessively changed and have weak resistances to noise.

If the digital broadcasting system according to the present invention multiplexes mobile service data along with main service data, and transmits the multiplexed result, it can quickly access a service which is provided as mobile service data.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of processing a digital broadcast signal in a transmitter, the method comprising:

encoding signaling information including a transmission parameter channel (TPC) including transmission parameters, and a fast information channel (FIC) including cross layer information for mobile service acquisition, wherein the encoding the [signal] *signaling* information comprises:

performing a first error correction encoding on the FIC;

multiplexing the first error correction encoded FIC with the TPC; and randomizing the multiplexed FIC and TPC; and transmitting the *digital* broadcast signal including ensembles including the encoded signaling information, wherein the FIC is divided into a number of FIC segments, wherein each of the FIC segments includes a FIC segment header and a FIC segment payload, wherein the FIC segment header includes type information indicating a type of the FIC segment, wherein the FIC further includes a first ensemble identifier identifying a specific ensemble including a service map table (SMT), and wherein the SMT comprises:

a header including a second ensemble identifier corresponding to the first ensemble identifier;

a payload including service acquisition information of the specific ensemble; and Internet Protocol (IP) access information of a mobile service for acquiring an IP datagram of the mobile service from the specific ensemble.

2. The method of claim 1, further comprising:

performing a second error correction encoding on the randomized FIC and TPC.

3. The method of claim 2, wherein the second error correction encoding corresponds to a Parallel Concatenated Convolutional Code (PCCC).

4. An apparatus for processing a digital broadcast signal, the apparatus comprising:

a signaling encoder configured to encode signaling information including a transmission parameter channel (TPC) including transmission parameters, and a fast information channel (FIC) including cross layer information for mobile service acquisition, wherein the signaling encoder is further configured to:

perform a first error correction encoding on the FIC;

multiplex the first error correction encoded FIC with the TPC; and randomize the multiplexed FIC and TPC; and a transmission unit configured to transmit the *digital* broadcast signal including ensembles including the encoded signaling information, wherein the FIC is divided into a number of FIC segments, wherein each of the FIC segments includes a FIC segment header and a FIC segment payload, wherein the FIC segment header includes type information indicating a type of the FIC segment, wherein the FIC further includes a first ensemble identifier identifying a specific ensemble including a service map table (SMT), and wherein the SMT comprises:

a header including a second ensemble identifier corresponding to the first ensemble identifier;

a payload including service acquisition information of the specific ensemble; and Internet Protocol (IP) access information of a mobile service for acquiring an IP datagram of the mobile service from the specific ensemble.

5. The apparatus of claim 4, wherein the signaling encoder is further configured to perform a second error correction encoding on the randomized FIC and TPC.

6. The apparatus of claim 5, wherein the second error correction encoding corresponds to a Parallel Concatenated Convolutional Code (PCCC).

*7. The method of claim 1,*

*wherein the SMT further includes a table ID indicating a type of a corresponding table.*

*8. The apparatus of claim 4,*

*wherein the SMT further includes a table ID indicating a type of a corresponding table.*

* * * * *